United States Patent
Bar-Or Tillinger et al.

(10) Patent No.: US 12,132,678 B2
(45) Date of Patent: Oct. 29, 2024

(54) CHANNEL STATE INFORMATION REPORTING USING DEMODULATION REFERENCE SIGNALS

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Tal Oved, Modiin (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 17/544,394

(22) Filed: Dec. 7, 2021

(65) Prior Publication Data

US 2023/0179364 A1 Jun. 8, 2023

(51) Int. Cl.
*H04L 5/00* (2006.01)

(52) U.S. Cl.
CPC .......... *H04L 5/0051* (2013.01); *H04L 5/0037* (2013.01); *H04L 5/0053* (2013.01); *H04L 5/0085* (2013.01)

(58) Field of Classification Search
CPC ... H04L 5/0051; H04L 5/0037; H04L 5/0053; H04L 5/0085; H04L 5/0039; H04L 5/0041; H04L 5/0048; H04L 5/0057
See application file for complete search history.

(56) References Cited

U.S. PATENT DOCUMENTS

| | | | |
|---|---|---|---|
| 2016/0352402 A1* | 12/2016 | Park | H04B 7/0478 |
| 2020/0145869 A1* | 5/2020 | Nammi | H04W 28/0215 |
| 2021/0184817 A1 | 6/2021 | Nammi et al. | |
| 2021/0336666 A1* | 10/2021 | Gutman | H04L 5/0051 |
| 2022/0053522 A1* | 2/2022 | MolavianJazi | H04W 72/1263 |
| 2023/0387999 A1* | 11/2023 | Flordelis | H04L 25/0224 |

OTHER PUBLICATIONS

CATT: "DMRS design for NR MIMO", 3GPP TSG RAN WG1 Meeting #87, R1-1611383, 3rd Generation Partnership Project, Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016, 4 Pages, XP051175364, The whole document.
International Search Report and Written Opinion—PCT/US2022/079713—ISA/EPO—Feb. 24, 2023 (2108535WO).

* cited by examiner

*Primary Examiner* — Warner Wong
*Assistant Examiner* — Brian T Le
(74) *Attorney, Agent, or Firm* — Holland & Hart LLP

(57) ABSTRACT

Methods, systems, and devices for wireless communications are described. The method may include a user equipment (UE) transmitting, to a base station, signaling indicating a capability of the UE to utilize a demodulation reference signal (DMRS) for channel state information (CSI) reporting. Upon receiving the signaling, the base station may transmit the DMRS and the UE may update a parameter of a CSI report in response to the received DMRS. The UE may then transmit the CSI report to the base station and the base station may utilize the CSI report for subsequent communications with the UE.

17 Claims, 17 Drawing Sheets based on DMRS

Refined based on Extended DMRS

CHANNEL STATE INFORMATION REPORTING USING DEMODULATION REFERENCE SIGNALS

INTRODUCTION

The following generally relates to wireless communications, and more specifically to channel reporting using reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a UE is described. The method may include transmitting, to a base station, signaling indicating a capability of the UE to utilize a demodulation reference signal (DMRS) for channel state information (CSI) reporting. In some examples, the method may further include receiving, from the base station and in response to the signaling indicating the capability of the UE, the DMRS. In some examples, the method may further include updating a parameter of a CSI report in response to the received DMRS. In some examples, the method may further include transmitting, to the base station, the CSI report including the updated parameter.

An apparatus for wireless communication at a UE is described. The apparatus may include a processor and memory coupled to the processor. In some examples, the processor and memory may be configured to transmit, to a base station, signaling indicating a capability of the UE to utilize a DMRS for CSI reporting. In some examples, the processor and memory may be configured to receive, from the base station and in response to the signaling indicating the capability of the UE, the DMRS. In some examples, the processor and memory may be configured to update a parameter of a CSI report in response to the received DMRS. In some examples, the processor and memory may be configured to transmit, to the base station, the CSI report including the updated parameter.

Another apparatus for wireless communication at a UE is described. In some examples, the apparatus may include means for transmitting, to a base station, signaling indicating a capability of the UE to utilize a DMRS for CSI reporting. In some examples, the apparatus may further include means for receiving, from the base station and in response to the signaling indicating the capability of the UE, the DMRS. In some examples, the apparatus may further include means for updating a parameter of a CSI report in response to the received DMRS. In some examples, the apparatus may further include means for transmitting, to the base station, the CSI report including the updated parameter.

A non-transitory computer-readable medium storing code for wireless communication at a UE is described. In some examples, the code may include instructions executable by a processor to transmit, to a base station, signaling indicating a capability of the UE to utilize a DMRS for CSI reporting. In some examples, the code may further include instructions executable by a processor to receive, from the base station and in response to the signaling indicating the capability of the UE, the DMRS. In some examples, the code may further include instructions executable by a processor to update a parameter of a CSI report in response to the received DMRS. In some examples, the code may further include instructions executable by a processor to transmit, to the base station, the CSI report including the updated parameter.

Some examples of the method, apparatuses, and non-transitory computer-readable medium described herein may further include operations, features, means, or instructions for receiving, from the base station and in response to the signaling indicating the capability of the UE, a pilot signal, where updating the parameter of the CSI report may be based on the received pilot signal.

In some examples of the method, apparatuses, and non-transitory computer-readable medium described herein, the pilot signal may be precoded using a precoding matrix that may be different than a precoding matrix used to precode the DMRS.

Some examples of the method, apparatuses, and non-transitory computer-readable medium described herein may further include operations, features, means, or instructions for generating the precoding matrix used to precode the pilot signal and transmitting, to the base station, signaling indicating the precoding matrix used to precode the pilot signal, where receiving the pilot signal may be based on transmitting the signaling indicating the precoding matrix used to precode the pilot signal.

Some examples of the method, apparatuses, and non-transitory computer-readable medium described herein may further include operations, features, means, or instructions for receiving, from the base station, a CSI reference signal (CSI-RS), where generating the precoding matrix used to precode the pilot signal may be based on the received CSI-RS.

Some examples of the method, apparatuses, and non-transitory computer-readable medium described herein may further include operations, features, means, or instructions for receiving, from the base station, signaling indicating the precoding matrix used to precode the pilot signal, where receiving the pilot signal may be based on receiving the signaling indicating the precoding matrix used to precode the pilot signal.

Some examples of the method, apparatuses, and non-transitory computer-readable medium described herein may further include operations, features, means, or instructions for receiving, from the base station, signaling indicating a set of resources for receiving the pilot signal, where the set of resources includes one or both of a subset of a set of resources allocated to the UE for downlink data transmissions or a subset of a set of resources allocated to the UE for DMRS transmissions.

Some examples of the method, apparatuses, and non-transitory computer-readable medium described herein may further include operations, features, means, or instructions for receiving, from the base station, signaling indicating a set of resources allocated to one or more second UEs for DMRS transmissions, where the DMRS may be received on the set of resources.

Some examples of the method, apparatuses, and non-transitory computer-readable medium described herein may further include operations, features, means, or instructions for receiving, from the base station, signaling indicating a periodicity associated with the CSI report, where transmitting the CSI report may be based on the periodicity.

In some examples of the method, apparatuses, and non-transitory computer-readable medium described herein, the periodicity indicates to transmit the CSI report on a slot-by-slot basis.

Some examples of the method, apparatuses, and non-transitory computer-readable medium described herein may further include operations, features, means, or instructions for receiving, from the base station and prior to receiving the DMRS, a CSI-RS and generating a second channel state information report based on the received CSI-RS.

In some examples of the method, apparatuses, and non-transitory computer-readable medium described herein, the parameter of the CSI report includes a precoding matrix indicator (PMI), a channel quality indicator (CQI), a rank indicator (RI), a modulation and coding scheme (MCS), a reference signal received power (RSRP) value, a signal-to-interference plus noise (SINR) value, or any combination thereof.

A method for wireless communications at a base station is described. The method may include receiving, from a UE, signaling indicating a capability of the UE to utilize a DMRS for CSI reporting. In some examples, the method may further include transmitting, to the UE and in response to the signaling indicating the capability of the UE, the DMRS. In some examples, the method may further include receiving, from the UE, a CSI report in response to transmitting the DMRS.

An apparatus for wireless communications at a base station is described. The apparatus may include a processor and memory coupled to the processor. In some examples, the processor and memory may be configured to receive, from a UE, signaling indicating a capability of the UE to utilize a DMRS for CSI reporting. In some examples, the processor and memory may be configured to transmit, to the UE and in response to the signaling indicating the capability of the UE, the DMRS. In some examples, the processor and memory may be configured to receive, from the UE, a CSI report in response to transmitting the DMRS.

Another apparatus for wireless communications at a base station is described. The apparatus may include means for receiving, from a UE, signaling indicating a capability of the UE to utilize a DMRS for CSI reporting. In some examples, the apparatus may further include means for means for transmitting, to the UE and in response to the signaling indicating the capability of the UE, the DMRS. In some examples, the apparatus may further include means for means for receiving, from the UE, a CSI report in response to transmitting the DMRS.

A non-transitory computer-readable medium storing code for wireless communications at a base station is described. The code may include instructions executable by a processor to receive, from a UE, signaling indicating a capability of the UE to utilize a DMRS for CSI reporting. In some examples, the code may further include instructions executable by a processor to transmit, to the UE and in response to the signaling indicating the capability of the UE, the DMRS. In some examples, the code may further include instructions executable by a processor to and receive, from the UE, a CSI report in response to transmitting the DMRS.

Some examples of the method, apparatuses, and non-transitory computer-readable medium described herein may further include operations, features, means, or instructions for transmitting, to the UE and in response to the signaling indicating the capability of the UE, a pilot signal, where receiving the CSI report may be based on transmitting the pilot signal.

Some examples of the method, apparatuses, and non-transitory computer-readable medium described herein may further include operations, features, means, or instructions for precoding the pilot signal using a precoding matrix that may be different than a precoding matrix used to precode the DMRS.

Some examples of the method, apparatuses, and non-transitory computer-readable medium described herein may further include operations, features, means, or instructions for receiving, from the UE, signaling indicating the precoding matrix used to precode the pilot signal, where precoding the pilot signal may be based on the signaling indicating the precoding matrix used to precode the pilot signal.

Some examples of the method, apparatuses, and non-transitory computer-readable medium described herein may further include operations, features, means, or instructions for transmitting, to the UE, signaling indicating the precoding matrix used to precode the pilot signal, where transmitting the pilot signal may be based on transmitting the signaling indicating the precoding matrix used to precode the pilot signal.

Some examples of the method, apparatuses, and non-transitory computer-readable medium described herein may further include operations, features, means, or instructions for determining a quantity of antenna ports for transmitting the pilot signal, where transmitting the pilot signal may be based on the determined quantity of antenna ports.

Some examples of the method, apparatuses, and non-transitory computer-readable medium described herein may further include operations, features, means, or instructions for transmitting, to the UE, signaling indicating a set of resources for receiving the pilot signal, where the set of resources includes one or both of a subset of a set of resources allocated to the UE for downlink data transmissions or a subset of a set of resources allocated to the UE for DMRS transmissions.

Some examples of the method, apparatuses, and non-transitory computer-readable medium described herein may further include operations, features, means, or instructions for transmitting, to the UE, signaling indicating a periodicity associated with the CSI report, where receiving the CSI report may be based on the periodicity.

In some examples of the method, apparatuses, and non-transitory computer-readable medium described herein, the periodicity indicates for the UE to transmit the CSI report on a slot-by-slot basis.

Some examples of the method, apparatuses, and non-transitory computer-readable medium described herein may further include operations, features, means, or instructions for transmitting, to the UE and prior to transmitting the DMRS, a CSI-RS and receiving, from the UE and prior to receiving the channel state information report, a second channel state information report based on transmitting the CSI-RS.

Some examples of the method, apparatuses, and non-transitory computer-readable medium described herein may further include operations, features, means, or instructions for combining one or more parameters of the second CSI report and one or more parameters of the CSI report and communicating with the UE based on the combination.

In some examples of the method, apparatuses, and non-transitory computer-readable medium described herein, the CSI report includes a parameter and the parameter includes a PMI, a CQI, an RI, an MCS, and RSRP value, an SINR value, or any combination thereof.

DETAILED DESCRIPTION

In some examples, a wireless communications system may support CSI reporting. A base station may transmit CSI-RSs to a UE and the UE may report CSI to the base station in a CSI report based on the CSI-RSs. The CSI report may include a CQI, a PMI, an RI, etc. The base station may use the CSI report to improve subsequent communication with the UE (e.g., select an MCS to communication with the UE or select a precoding matrix to use for communication with the UE). To promote accurate CSI reporting to the base station, the UE may report CSI at a high periodicity (e.g., slot by slot) because a downlink channel between the UE and the base station may change over time. To report CSI at the high periodicity, more CSI-RS resources may be allocated to UEs or the base station may transmit CSI-RSs to the UEs more frequently than if CSI was reported at a low periodicity (e.g., every few slots). More CSI-RS resources allocated to the UE and more frequency transmissions of CSI-RSs to the UE may increase overhead signaling on the downlink and decrease the efficiency of the wireless communications system.

In some examples, the UE may update the CSI report based on information obtained from DMRSs and/or an extended DMRSs. The UE may receive DMRSs and/or extended DMRSs from the base station and estimate information associated with the downlink channel between the UE and the base station based on the received DMRSs and/or the extended DMRSs. An extended DMRS may be an example of a pilot signal precoded using a precoding matrix that is different from a precoding matrix of the DMRS and may be transmitted along with the DMRS. Using this information, the UE may update a CSI report to be sent to the base station (e.g., the CSI report generated based on CSI-RSs). As an example, the UE may update the PMI of the CSI report or the CQI of the CSI report. The techniques as described herein may allow the UE to transmit frequent CSI reports to the base station without dedicating resources for CSI-RSs for each report. For example, the UE may report CSI slot by slot by reporting CSI in a first uplink slot using CSI-RSs and reporting CSI in a consecutive uplink slot using DMRSs and/or extended DMRSs. Using these techniques, the base station may transmit CSI-RS at a low periodicity (e.g., every few downlink slots) and decrease the overhead signaling on the downlink as compared to other methods while obtaining frequent CSI reports from the UE.

Aspects of the disclosure are initially described in the context of wireless communications systems. Additional aspects are described in the context of a frame, precoding schemes, and a process flow. Aspects of the disclosure are further illustrated by and described with reference to apparatus diagrams, system diagrams, and flowcharts that relate to CSI reporting using DMRSs.

Figure 1:
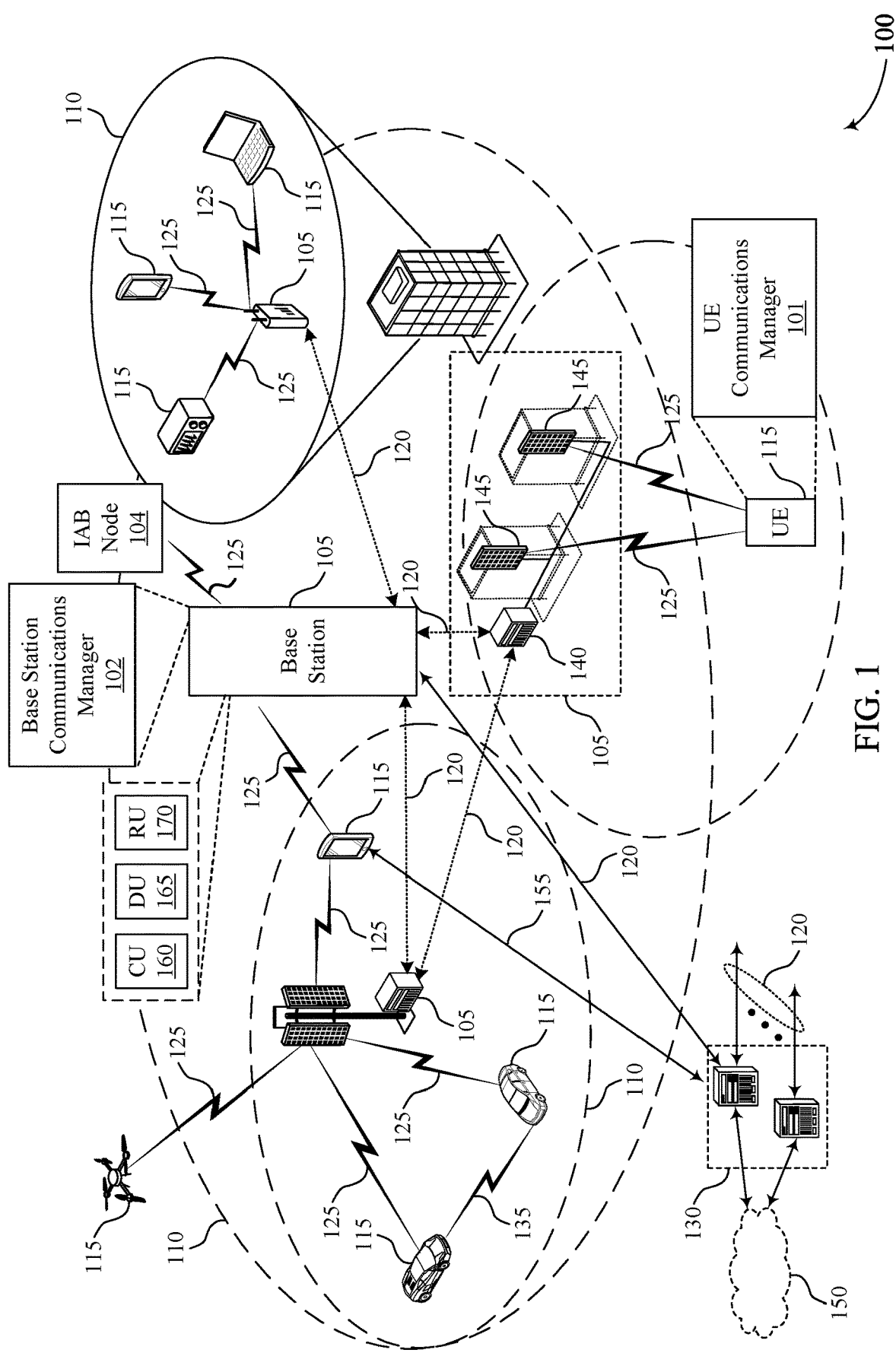
FIGS. 1 and 2 illustrate examples of a wireless communications system that supports CSI reporting using DMRSs in accordance with one or more aspects of the present disclosure.

FIG. 1 illustrates an example of a wireless communications system 100 that supports CSI reporting using DMRSs in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. A UE 115 may communicate with the core network 130 through a communication link 155.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a base station 105 may additionally or alternatively be performed by components of the disaggregated RAN architecture (e.g., IAB nodes, DUs, CUs, etc.).

In some examples, the wireless communications system 100 may support CSI reporting using DMRSs. The base station 105 may include a base station communications manager 102 and the UE 115 may include a UE communications manager 101. The base station communications manager 102 may be an example of a communications manager as described in FIGS. 10 through 13. The UE communications manager 101 may be an example of a communications manager as described in FIGS. 6 through 9.

The UE 115 may transmit, to the base station 105, a capability message indicating whether the UE 115 is capable of utilizing DMRSs for CSI reporting (e.g., using the UE communications manager 101). Based on the received capability message, the base station 105 may transmit one or more DMRSs to the UE 115 (e.g., using the base station communications manager 102) and the UE 115 may obtain measurement information using the received one or more DMRSs (e.g., perform channel estimation) Additionally, in some examples, the base station 105 may also transmit one or more pilots signals to the UE 115 and the UE 115 may obtain the measurement information using the one or more received pilots signals. The UE may update one or more parameter of a CSI report (e.g., CSI report generated from previously received CSI-RSs) based on the measurement information and transmit the CSI report including the updated one or more parameters to the base station 105 and the base station 105 may use the updated parameters of the CSI report to improve subsequent communications with the UE 115. The techniques as described herein may allow the UE 115 to provide the base station 105 with frequent CSI reports while reducing downlink overhead signaling related to CSI-RS transmissions when compared to other methods.

Figure 2:
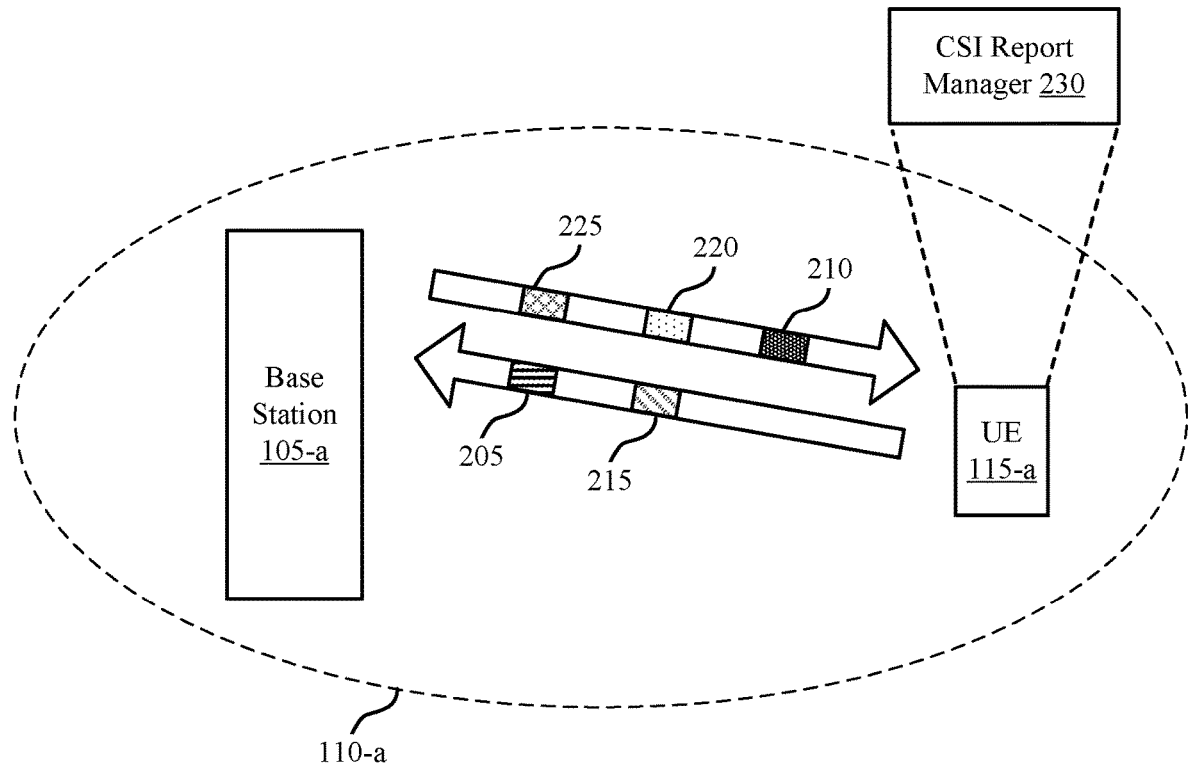
Figure 2:
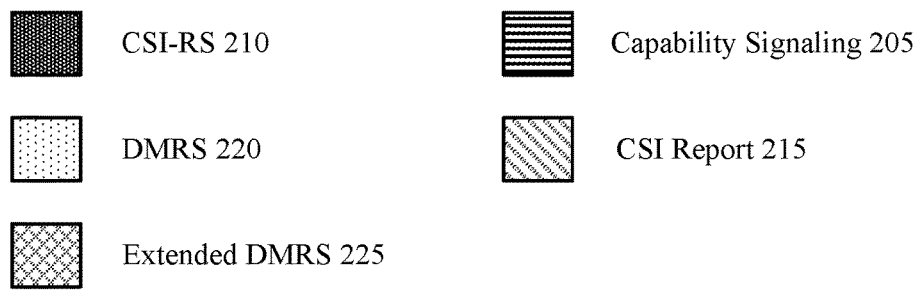

FIG. 2 illustrates an example of a wireless communications system 200 that supports CSI reporting using DMRSs in accordance with one or more aspects of the present disclosure. In some examples, the wireless communications system 200 may implement aspects of a wireless communications system 100. For example, the wireless communications system 200 may include a base station 105-*a* and a UE 115-*a* which may be examples of a base station 105 and a UE 115 as described with reference to FIG. 1. In some examples, the base station 105-*a* and the UE 115-*a* may be located within a coverage area 110-*a*.

In some examples, the wireless communications system 200 may support CSI reporting. To support CSI reporting, the base station 105-*a* may transmit a set of CSI-RSs 210 to the UE 115-*a*. The UE 115-*a* may obtain CSI based on the CSI-RSs 210 and transmit a CSI report 215 to the base station 105-*a* including the CSI. The CSI may include one or more of a CQI, a PMI, a precoding type indicator (PTI), or an RI. The base station 105-*a* may utilize CSI to improve communications with the UE 115-*a*. For example, the base station 105-*a* may utilize the CQI to select an MCS for subsequent communication with the UE 115-*a* and utilize the RI to determine a transmission mode for subsequent communication with the UE 115-*a* (e.g., Tx diversity mode or MIMO transmission mode). The PMI, on the other hand, may indicate a precoding matrix that the UE 115-*a* prefers the base station 105-*a* to use when communicating with the UE 115-*a* and the base station 105-*a* may determine a precoding matrix to use for communication with the UE 115-*a* based on the received PMI. The base station 105-*a* may configure the UE 115-*a* to report CSI periodically or aperiodically. As one example, the base station 105-*a* may configure the UE 115-*a* to report CSI in every uplink slot (e.g., at a high periodicity) or every few uplink slots (e.g., at a low periodicity).

In some examples, a downlink channel between the UE 115-*a* and the base station 105-*a* may change over time and as a result, CSI may also change over time. To account for the dynamic downlink channel, the base station 105-*a* may configure the UE 115-*a* to transmit CSI at the high periodicity such that the CSI reports 215 may be accurate. Accurate CSI reports 215 may be beneficial to the performance of the wireless communications system 200. For example, the base station 105-*a* may support retransmission schemes such as a multiple incremental redundancy scheme (MIRS) which may rely on accurate CSI reporting. MIRS is a rate, precoding, and rank adaption scheme based on multiple retransmissions. However, providing the CSI reports 215 to the base station 105-*a* at the high periodicity may increase overhead signaling on the downlink. That is, power consumption at the UE 115-*a* may increase in order to process CSI-RSs 210 at every downlink slot for transmission of a CSI report 215 in every uplink slot.

As described herein, the UE 115-*a* may update or generate CSI reports based on a DMRS 220 received from the base station 105-*a*. DMRSs 220 may be used by the UE 115-*a* to decode downlink data transmissions (e.g., physical downlink shared channel (PDSCH) transmissions) from the base station 105-*a* and as such, may be received by the UE 115-*a* in downlink slots that contains data. In some examples, the base station 105-*a* may precode the DMRS 220 before transmitting the DMRS 220 to the UE 115-*a*. Precoding may be described as the process of mapping layered data to transmit antenna ports. Additionally, precoding may involve multiplying a multi-bit signal with a precoding matrix such that each antenna may accumulate several layers with an appropriate weighting. If the number of transmit antenna ports at the base station 105-*a* is larger than a number of layers used to transmit the DMRS 220, the DMRS 220 may be precoded using non-square precoding (e.g., a number of rows of the precoding matrix is not equal to a number of columns of the precoding matrix).

The UE 115-*a* may receive the DMRS 220 from the base station 105-*a* and estimate the downlink channel (e.g., a downlink channel matrix) based on the DMRS 220. That is, the UE 115-*a* may estimate a downlink channel response, a noise of the downlink channel, an interference of the downlink channel, etc. Upon estimating the downlink channel, the UE 115-*a* may implement a CSI report manager 230 included at the UE 115-*a*. Using the CSI report manager 230, the UE 115-*a* may update one or more parameters (e.g., the CQI, the PMI, the PTI, or the RI). of the CSI report 215 using the estimated downlink channel or measurement information obtained via the channel estimation. As described above, the DMRS 220 may be precoded using non-square precoding resulting in channel estimation per layer and not per antenna port which may limit a precoding estimation subspace (or a PMI evaluation subspace). To increase or improve the precoding subspace, the UE 115 may additionally utilize an extended DMRS 225 to update the one or more parameters of the CSI report 215. The extended DMRS 225 may be described as a pilot signal. The precoding matrix used to precode the extended DMRS 225 may be different from the precoding matric used to precode the DMRS 220, but in some examples, may be associated with a precoding matrix used to precode the DMRS 220. For example, the precoding matrix used to precode the extended DMRS 225 may be orthogonal to the precoding used to precode the DMRS 220.

If the UE 115-*a* supports the use of the extended DMRS 225, the UE 115-*a* may receive the extended DMRS 225 and the DMRS 220 from the base station 105-*a* and estimate the downlink channel (e.g., a downlink channel matrix) based on the DMRS 220 and the extended DMRS 225. Upon estimating the downlink channel, the CSI report manager 230 may update the one or more parameters of the CSI report 215 using one or both of the estimated downlink channel or measurement information obtained from the channel estimation. Upon updating the one or more parameters (e.g., using the extended DMRS 225 and/or the DMRS 220), the UE 115-*a* may generate a second CSI report 215 including the updated one or more parameters. In one example, the UE 115-*a* may update the PMI of the CSI report 215 or the CQI of the CSI report 215. The UE 115-*a* may then transmit the second CSI report 215 to the base station 105-*a*.

In some examples, the UE 115-*a* may transmit the second CSI report 215 as part of uplink control information (UCI). That is, the second CSI report 215 may be aggregated with other UCI such as acknowledgement (ACK)/negative acknowledgement (NACK) feedback or gap to capacity. A UCI format used to transmit the second CSI report 215 may be dedicated or may be an extension of an existing UCI format. The base station 105-*a* may utilize the received second CSI report 215 to improve subsequent communication with the UE 115-*a*. In some examples, the base station 105-*a* may use a combination of the information from both the CSI-RS generated report (e.g., CSI report generated using CSI-RSs 210) and the DMRS generated report (e.g., CSI report generated using DMRSs 220 or extended DMRSs 225) to improve subsequent communications with the UE 115-*a*.

In some examples, prior to generating the CSI reports 215, the UE 115-*a* may transmit capability signaling 205 related to CSI reporting to the base station 105-*a*. The capability signaling 205 may indicate to the base station 105-*a* whether the UE 115-*a* is able to support DMRS based CSI reporting or extended DMRS based CSI reporting. If the UE 115-*a* is unable to the support DMRS based CSI reporting or extended DMRS based CSI reporting, the base station 105-*a* may transmit the CSI-RS 210 at the high periodicity and if the UE 115-*a* is able to support DMRS based CSI reporting or extended CSI based reporting, the base station 105-a may transmit CSI-RSs at the low periodicity. If UE 115-a is capable of supporting extended DMRS based CSI reporting, the UE 115-a may transmit an indication of a precoding matrix to be used to precode the extended DMRS 225 to the base station 105-a. The UE 115-a may estimate the extended DMRS precoding matrix using measurements obtained from CSI-RSs 210. The base station 105-a may utilize the precoding matrix indicated by the UE 115-a to precode the extended DMRS 225 or the base station 105-a may select a different precoding matrix (e.g., different from the precoding matrix estimated by the UE 115-a) to precode the extended DMRS 225. A quantity of antenna ports and a set of resources used to transmit the extended DMRS 225 may be determined by the base station 105-a and indicated to the UE 115-a. The set of resources allocated for the extended DMRS 225 may be unused resources allocated for either DMRS transmissions or PDSCH transmissions. Using the techniques as described herein may allow a UE 115-a to provide the base station 105-a with frequent and accurate CSI report while decreasing overhead signaling related to CSI-RS transmissions.

Figure 3:
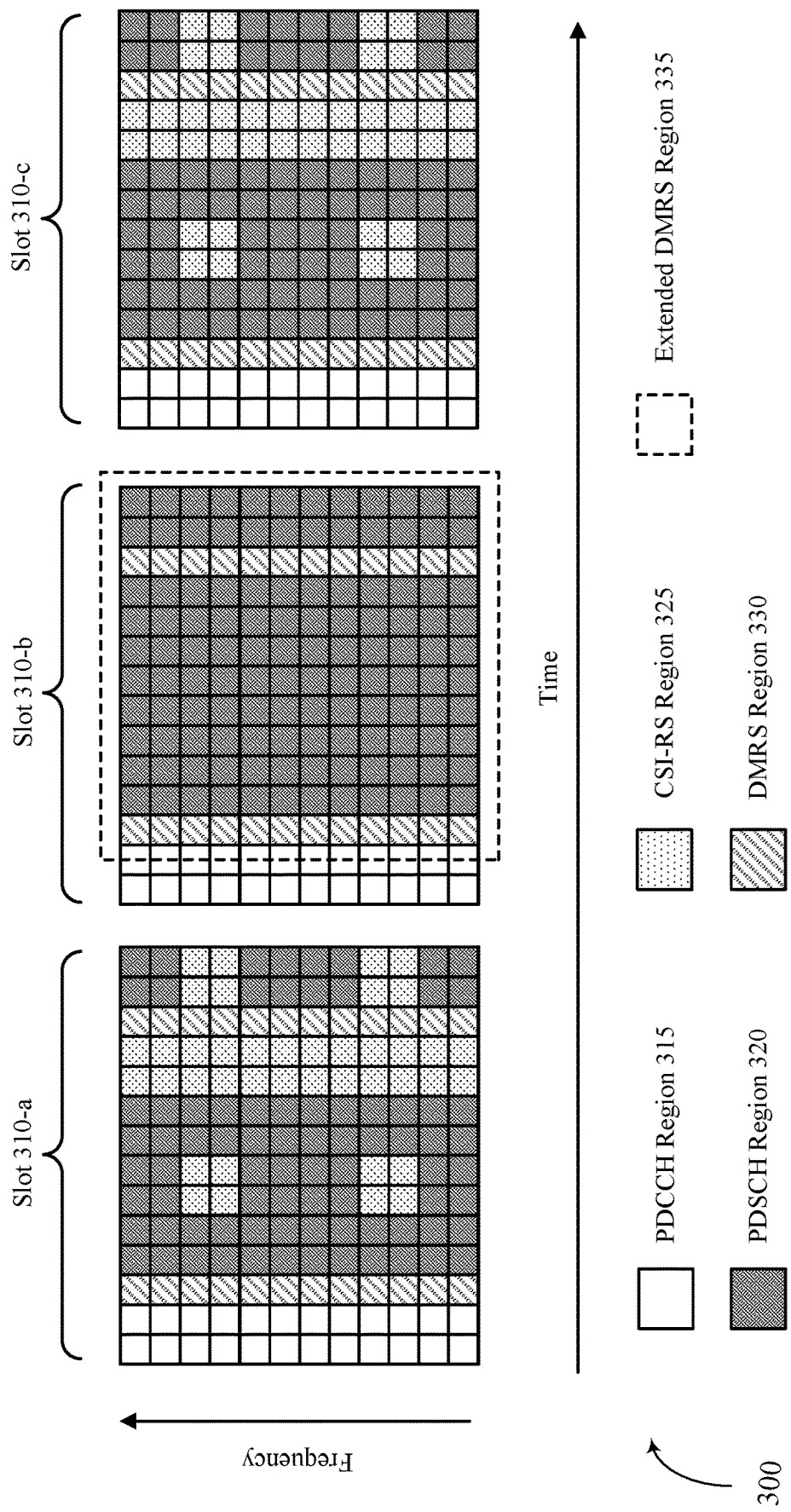
FIG. 3 illustrates an example of a frame that supports CSI reporting using DMRSs in accordance with one or more aspects of the present disclosure.

FIG. 3 illustrates an example of a frame 300 that supports CSI reporting using DMRSs in accordance with one or more aspects of the present disclosure. In some examples, the frame 300 may be implement by aspects of a wireless communications system 100 and a wireless communications system 200. For example, the frame format may be implemented by a base station 105 and a UE 115 as described with reference to FIGS. 1 and 2.

As shown in FIG. 3, the frame 300 may include a slot 310-a, a slot 310-b, and a slot 310-c. The slot 310-a, the slot 310-b, and the slot 310-c may be examples of downlink slots and may include a respective set of resources that a UE and a base station may utilize to receive or transmit downlink signals. The frame 300 may also include uplink slots (not shown) that may, in some examples, be situated in between one or more of the slots 310. The set of resources of each slot 310 may be divided into multiple subsets of resources, where each subset corresponds to a type of transmission (e.g., allocated for transmission or reception of a type of signal). For example, the slots 310 may include one or more of a physical downlink control channel (PDCCH) region 315, a PDSCH region 320, a CSI-RS region 325, a DMRS region 330, or an extended DMRS region 335. Although FIG. 3 shows 5 types of regions, it understood that more regions may exists. Additionally, the frequency and time locations of the resources included in the different regions may change. That is, the resource grids illustrated in FIG. 3 are merely examples of how the resources may be arranged.

As described in FIG. 2, the UE may support DMRS or extended DMRS based CSI reporting. In some examples, to support DMRS or extended DMRS based CSI reporting, the UE may first generate a CSI report using CSI-RSs received from the base station. As shown in FIG. 3, the slot 310-a may come before the slot 310-b and the slot 310-c in time and include the PDCCH region 315, the PDSCH region 320, the CSI-RS region 325, and the DMRS region 330. At slot 310-a, the UE may receive one or more CSI-RSs over at least a portion of the resources of the CSI-RS region 325 and generate a first CSI report based on the received one or more CSI-RSs. In some examples, the CSI report may include an indication of a precoding matrix that the base station may use for subsequent communication with the UE. The CSI report may also include other parameters such as a CQI, a PMI, a PTI, or an RI. The UE may transmit the first CSI report to the base station in an uplink slot subsequent to the slot 310-a.

The UE may then update the one or more parameters of the CSI report based on one or both of a DMRS or an extended DMRS. As shown in FIG. 3, the slot 310-b may be located after the slot 310-a in time and include the PDCCH region 315, the PDSCH region 320, and the DMRS region 330. At slot 310-b, the UE may receive one or more DMRSs over at least a portion of the resources of the DMRS region 330. Additionally, at slot 310-b, the UE may receive one or more extended DMRSs over at least a portion of the resources included in the extended DMRS region 335. The extended DMRS region 335 may include a portion of one or both of the DMRS region 330 and the PDSCH region 320. That is, unused PDSCH resources or unused DMRS resources may be allocated for extended DMRSs. The UE may update the one or more parameters of the first CSI report based on the received one or more DMRSs and the possible one or more extended DMRS and generate a second CSI report including the updated one or more parameters. As one example, the UE may estimate a precoding matrix (e.g., different from a precoding matrix included in the first CSI report) using the DMRS and/or the extended DMRS and include the estimated precoding matrix in the second CSI report. The UE may transmit the second CSI report to the base station in an uplink slot subsequent to the slot 310-b.

A location (e.g., a time location) of the slot 310-b in relation to the slot 310-a may depend on a periodicity of CSI reporting. In one example, the periodicity may be slot by slot. In one example of slot by slot reporting, CSI is reported in every uplink slot. In such scenario, the slot 310-b may be separated from the slot 310-a by a single uplink slot. In another example of slot by slot reporting, the UE may report the CSI in all of the downlink slots 310 that the DMRS or the CSI-RSs are received. For example, the UE may report the CSI in the last few symbols of the slot 310-a, the slot 310-b, and the slots 310-c. In such example, a PUCCH region may occupy the last few symbols of the slot 310-a, slot 310-b, and the slot 310-c (not shown) and the CSI may be included in UCI. As another example, the periodicity may be every few slots. That is, CSI is reported every few uplink slots (e.g., every two uplink slots). In such scenario, the slot 310-a and the slot 310-b may be separated by two or more uplink slots. In some examples, the base station may transmit signaling to the UE indicating the periodicity of CSI reporting. Further, the methods as described herein may be applied to a UE operating in a full-duplex mode. While operating in a full-duplex mode, the UE may transmit and receive simultaneously on different frequencies. As such, the UE may report CSI in the same slot 310 that the DMRSs or the CSI-RS are received (e.g., on a slot by slot basis or every few slots).

The techniques as described herein may allow the UE to report CSI at high periodicity while CSI-RS periodicity is kept low. That is, CSI reporting may occur on a slot by slot basis while CSI-RS may not be transmitted on a slot by slot basis, but at a lower periodicity. For example, in FIG. 3, CSI-RSs may be received over two of the three slots (e.g., the slot 310-a and the slot 310-b), but the UE may report CSI for each of the three slots. This allows the UE to provide the base station with frequent CSI reports while reducing overhead signaling related to CSI-RSs. In some examples, the base station may transmit signaling to the UE indicating the periodicity associated with CSI-RSs.

Figure 4A:
FIGS. 4A and 4B illustrate examples of a precoding scheme that supports CSI reporting using DMRSs in accordance with one or more aspects of the present disclosure.
Figure 4A:
Figure 4A:
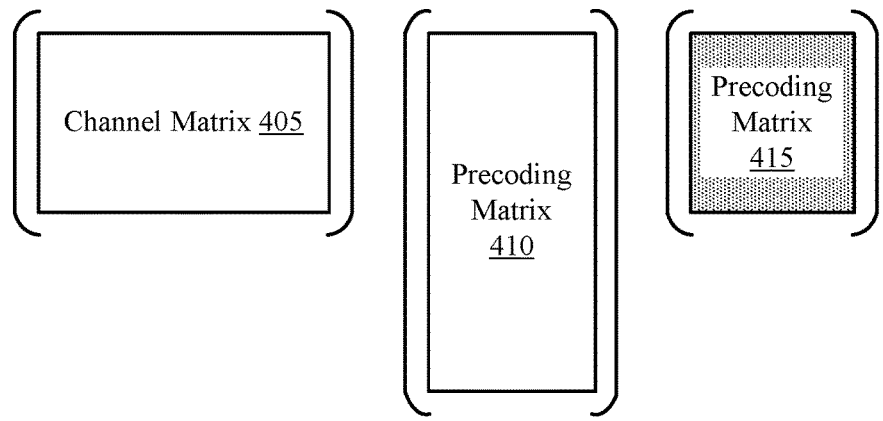
Figure 4A:
Figure 4B:
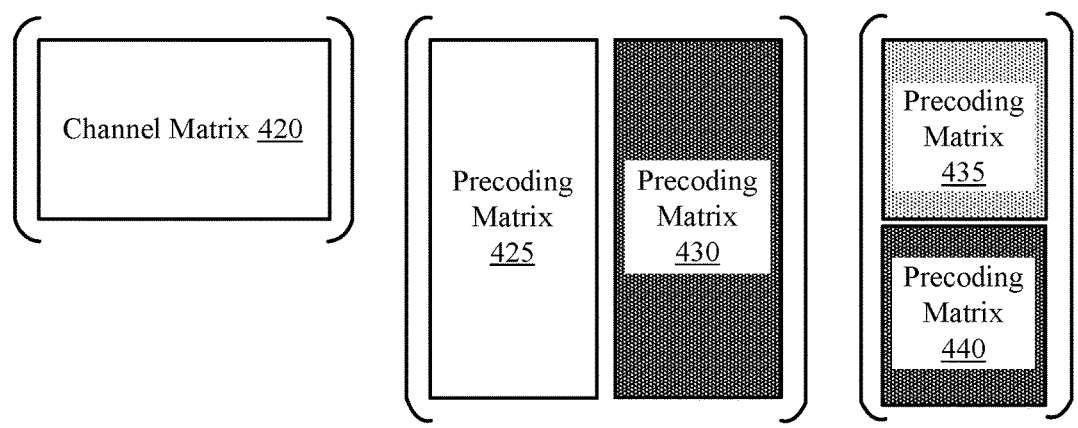
Figure 4B:

FIGS. 4A and 4B illustrate examples of a precoding scheme 400 (e.g., a precoding scheme 400-a and a precoding scheme 400-b) that supports CSI reporting using DMRSs in accordance with one or more aspects of the present disclosure. In some examples, the precoding scheme 400-a and the precoding scheme 400-b may be implemented by aspects of a wireless communications system 100 and a wireless communications system 200. For example, the precoding scheme 400-a and the precoding scheme 400-b may be implemented by a base station 105 or a UE 115 as described with reference to FIGS. 1 and 2.

Precoding scheme 400-a relates to DMRS based CSI reporting. As described in FIG. 2, a UE may receive CSI-RSs and determine CSI based on measurements of the CSI-RSs. In some examples, the CSI may include a precoding matrix estimated using the CSI-RSs. The dimensions of the precoding matrix estimated from the CSI-RSs may be a quantity of transmit antennas used to transmit the CSI-RSs by a quantity of layers used to transmit the CSI-RSs. The UE may include an indication of the precoding matrix (e.g., a PMI) in a first CSI report and transmit the first CSI report to the base station.

Upon transmitting the first CSI report, the UE may receive DMRSs from the base station. The UE may be unable to estimate a full channel matrix 405 using the DMRSs, but may estimate a product of the channel matrix 405 and a precoding matrix 410 used to precode the DMRSs. The dimensions of the full channel matrix 405 may be a quantity of receive antennas at the UE by a quantity of transmit antennas at the base station. Using the estimated product, the UE may determine CSI. An example of the CSI may be a precoding matrix 415. The dimension of the precoding matrix 415 may be a quantity of layers used to transmit the DMRS by the quantity of layers used to transmit the DMRS. The UE may include an indication of the precoding matrix 415 in a second CSI report and transmit the CSI report to the base station. The base station may receive the second CSI report and use the CSI to improve communication with the UE. In some examples, the base station may use both the precoding matrix estimated using the CSI-RSs (e.g., from the first CSI report) and the precoding matrix 415 (e.g., from the second CSI report) to improve communication with the UE. For example, the base station may apply the precoding matrix 415 on top of the precoding matrix estimated using the CSI-RSs. That is, the base station may use a product of the precoding matrix estimated using the CSI-RSs and the precoding matrix 415.

Precoding scheme 400-b relates to extended DMRS based CSI reporting. As described in FIG. 2, a UE may receive CSI-RSs and determine CSI based on measurements of the CSI-RSs. In some examples, the CSI may include a precoding matrix estimated using the CSI-RSs. The dimensions of the precoding matrix estimated from the CSI-RSs may be the quantity of transmit antennas used to transmit the CSI-RSs by the quantity of layers used to transmit the CSI-RSs. The UE may include an indication of the precoding matrix (e.g., a PMI) in a first CSI report and transmit the first CSI report to the base station.

Upon transmitting the first CSI report, the UE may receive DMRSs and extended DMRSs from the base station. The UE may be unable to determine the full channel matrix 420 using the DMRs and the extended DMRSs, but may estimate a product of the channel matrix 420, a precoding matrix 425 used to precode the DMRS, and a precoding matrix 430 used to precode the extended DMRS. The dimensions of the of the full channel matrix 420 may be the quantity of receive antennas at the UE by the quantity of transmit antennas at the base station. The dimensions of the precoding matrix 425 may be the quantity of antennas used to transmit the DMRSs by the quantity of layers used to transmit the DMRSs. The dimensions of the precoding matrix 430 may be a quantity of transmit antennas used to transmit the extended DMRSs by a quantity of antenna ports used to transmit the extended DMRSs. Using the estimated product, the UE may determine the CSI. An example of the CSI may be a precoding matrix 435 and a precoding matrix 440. The dimensions of the precoding matrix 435 may be a quantity of layers used to transmit the DMRS by the quantity of layers used to transmit the DMRS and the dimensions of the precoding matrix 440 may be a quantity antenna ports used to transmit the extended DMRS by a quantity of layers used to transmit the extended DMRS.

The UE may include an indication of the precoding matrix 435 and the precoding matrix 440 in a second CSI report and transmit the CSI report to the base station. The base station may receive the second CSI report and use the CSI to improve communication with the UE. In some examples, the base station may use a combination of the precoding matrix estimated using the CSI-RSs, the precoding matrix 435, and the precoding matrix 440 to improve communication with the UE. For example, the base station may apply the precoding matrix estimated using the CSI-RSs on top of the precoding matrix 435 and the precoding matrix 440. That is, the base station may use a product of the precoding matrix estimated using the CSI-RSs, the precoding matrix 435, and the precoding matrix 440.

In some examples, the UE and the base station may support narrow band precoding. In narrow band precoding, multiple precoding matrixes may be signaled to the base station via CSI, where each precoding matrix may be dedicated to different sets of subcarriers. As such, the UE may report multiple precoding matrices 415 in the CSI when only DMRSs are used and report multiple precoding matrices 435 and precoding matrices 440 when DMRSs and extended DMRSs are used.

Figure 5:
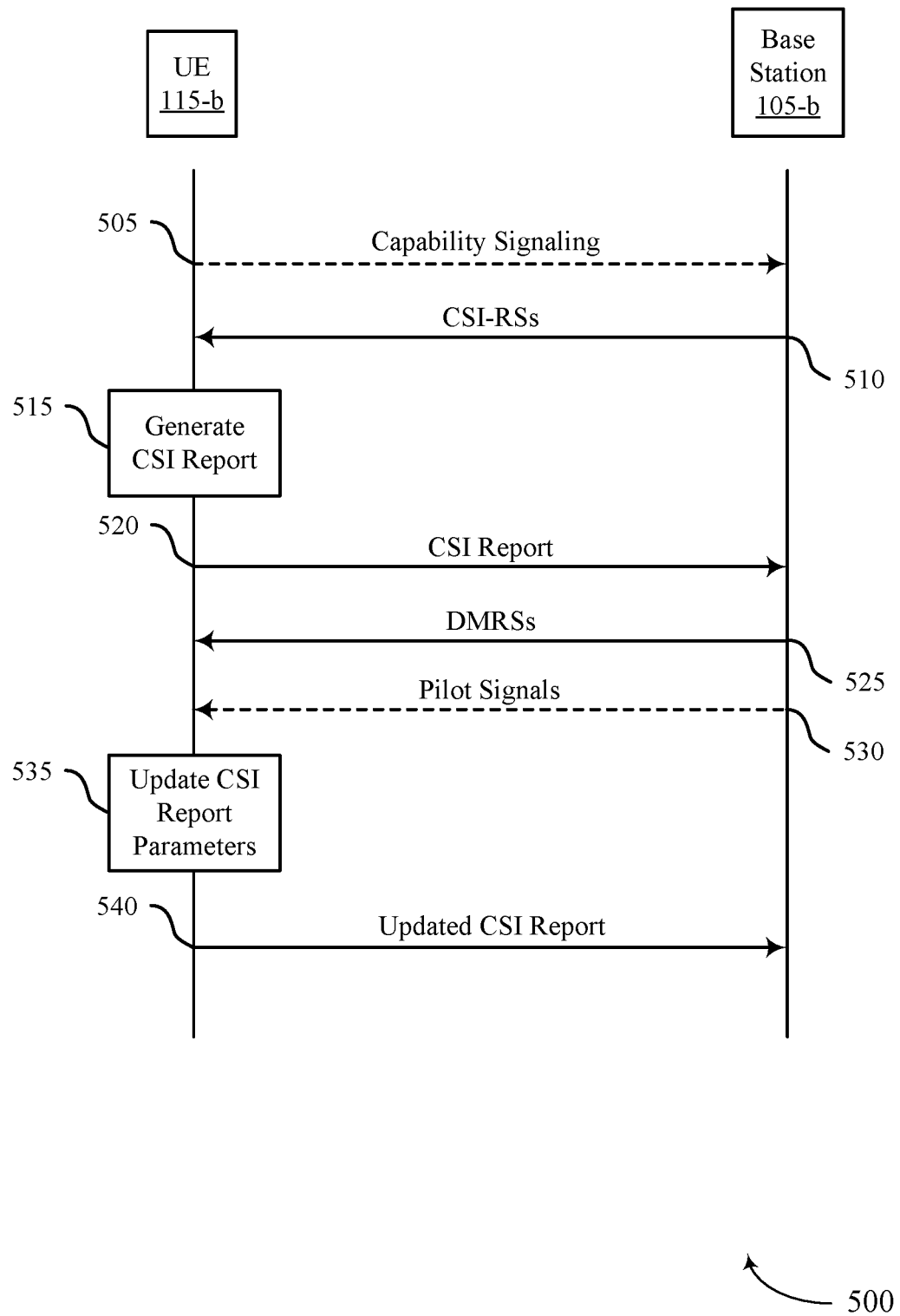
FIG. 5 illustrates an example of a process flow that supports CSI reporting using DMRSs in accordance with one or more aspects of the present disclosure.

FIG. 5 illustrates an example of a process flow 500 that supports CSI reporting using DMRSs in accordance with one or more aspects of the present disclosure. In some examples, the process flow 500 may implement aspects of a wireless communications system 100 and a wireless communications system 200. For example, the process flow 500 may be implemented by a UE 115-b and a base station 105-b which may be examples of a UE 115 and a base station 105 as described with reference to FIGS. 1 and 2. Alternative examples of the following may be implemented, where some steps are performed in a different order then described or are not performed at all. In some cases, steps may include additional features not mentioned below, or further steps may be added.

At 505, the UE 115-b may potentially transmit, to the base station 105-b, signaling indicating a capability of the UE 115-b to utilize one or both of a DMRS or an extended DMRS for CSI reporting. In some examples, the UE 115-b may transmit the capability signaling via RRC signaling or a MAC-CE.

At 510, the base station 105-b may transmit one or more CSI-RSs to the UE 115-b. In some examples, the base station 105-b may transmit the one or more CSI-RSs at some periodicity. In some examples, the base station 105-b may transmit the one or more CSI-RSs at a low periodicity. That is, the base station 105-b may not transmit the one or more CSI-RS on a slot by slot basis.

At 515, the UE 115-b may perform measurements on the one or more received CSI-RSs and generate a CSI report using the measurements. In some examples, the CSI report may include one or more parameters. Examples of the one or more parameters may be a PMI (e.g., indication of a precoding matrix), a CQI, an RI, an MCS, an RSRP, an SINR, etc. The UE 115-*b* may then transmit the CSI report to the base station 105-*b* at 520.

At 525, the base station 105-*b* may transmit one or more DMRSs to the UE 115-*b*. Additionally, at 530, the base station 105-*b* may transmit one or more pilots signals (e.g., one or more extended DMRSs) to the UE 115-*b*. In some examples, the precoding matrix used to precode the one or more pilot signals may be different from the precoding matrix used to precode the one DMRSs. In one example, the precoding matrix used to precode the one or more pilot signals may be orthogonal to the precoding matrix used to precode the one or more DMRSs. In some examples, the UE 115-*b* may estimate a precoding matrix to be used to precode the one or more pilots signals based on CSI-RS measurements made at 515 and transmit an indication of the estimated precoding matrix to be used to precode the one or more pilot signals to the base station 105-*b* (e.g., via RRC signaling or a MAC-CE). In another example, the base station 105-*b* may transmit an indication of the precoding matrix to be used to precode the one or more pilot signals to the UE 115-*b* (e.g., via downlink control information (DCI), RRC signaling, or a MAC-CE). In some examples, the base station 105-*b* may transmit, to the UE 115-*b*, an indication of a set of resources to use to receive the one or more pilot signals and the UE 115-*b* may receive the one or more pilot signals over the set of resources. That is, the base station 105-*b* may determine a dedicated grid in time and frequency for the one or more pilot signals and transmit an indication of the grid to the UE 115-*b*. In some examples, the number of antenna ports used to transmit the one or more pilot signals may be determined by the base station 105-*b*.

The UE 115-*b* may measure one or both of the one or more DMRSs or the one or more pilot signals and in some examples, estimate a channel (e.g., a downlink channel between the UE 115-*b* and the base station 105-*b*) using the DMRS measurements. In some examples, the base station 105-*b* may transmit an indication of DMRS characteristics of neighboring UEs 115 to the UE 115-*b*. The DMRS characteristics may include sets of resources allocated to the neighboring UEs 115 for DMRS transmissions. In some examples, the UE 115-*b* may monitor the sets of resources for one or more DMRSs and perform measurements on the one or more DMRSs. The neighboring UE DMRS measurements may be used along with the other DMRS measurements to perform the channel estimation.

At 535, using the measurements (e.g., one or both of the DMRS measurements or the pilot signal measurements), the UE 115-*b* may update one or more parameters of the CSI report generated at 515. The UE 115-*b* may update the PMI (e.g., indication of a precoding matrix), a CQI, an RI, an MCS, an RSRP, an SINR, etc. of the CSI report.

At 530, the UE 115-*b* may generate a CSI report that includes the updated one or more parameters and transmit the CSI report to the UE 115-*b*. In some examples, the UE 115-*b* may transmit the CSI report in UCI. The UE 115-*b* may transmit the CSI report with some periodicity. In some examples, the base station 105-*b* may transmit an indication of a periodicity of the CSI report to the UE 115-*b* (e.g., via DCI, RRC signaling, or a MAC-CE). In some examples, the periodicity of the CSI report may be a high periodicity. That is, the CSI report may be reported on a slot by slot basis. The base station 105-*b* may receive the CSI report and improve communication with the UE 115-*b* using the CSI report. In some examples, the base station may combine the one or more parameters of the CSI report transmitted at 520 with the one or more parameters of the CSI report transmitted 540 to improve communications with the UE 115-*b*.

Figure 6:
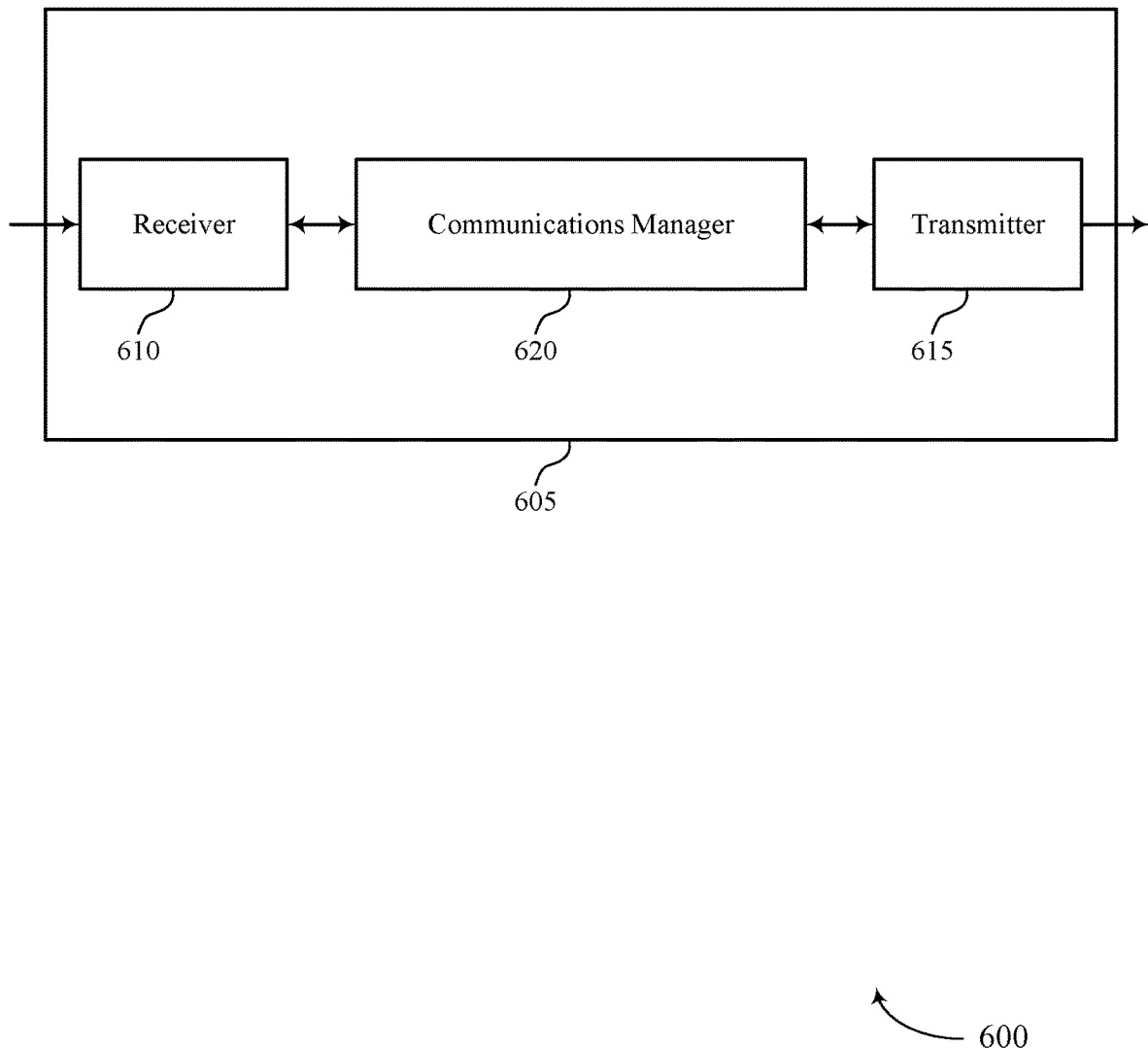
FIGS. 6 and 7 show block diagrams of devices that support CSI reporting using DMRSs in accordance with one or more aspects of the present disclosure.

FIG. 6 shows a block diagram 600 of a device 605 that supports CSI reporting using DMRSs in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to CSI reporting using DMRSs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CSI reporting using DMRSs). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of CSI reporting using DMRSs as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for transmitting, to a base station, signaling indicating a capability of the UE to utilize a DMRS for CSI reporting. The communications manager 620 may be configured as or otherwise support a means for receiving, from the base station and in response to the signaling indicating the capability of the UE, the DMRS. The communications manager 620 may be configured as or otherwise support a means for updating a parameter of a CSI report in response to the received DMRS. The communications manager 620 may be configured as or otherwise support a means for transmitting, to the base station, the CSI report including the updated parameter.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and more efficient utilization of communication resources. The techniques as described herein may allow the device 605 to transmit frequent CSI reports to the base station without dedicating resources for CSI-RSs for each report. As such, the base station may transmit CSI-RS at a low periodicity (e.g., every few downlink slots) and decrease the overhead signaling on the downlink and processing of the CSI-RSs at the device 605 as compared to other methods.

Figure 7:
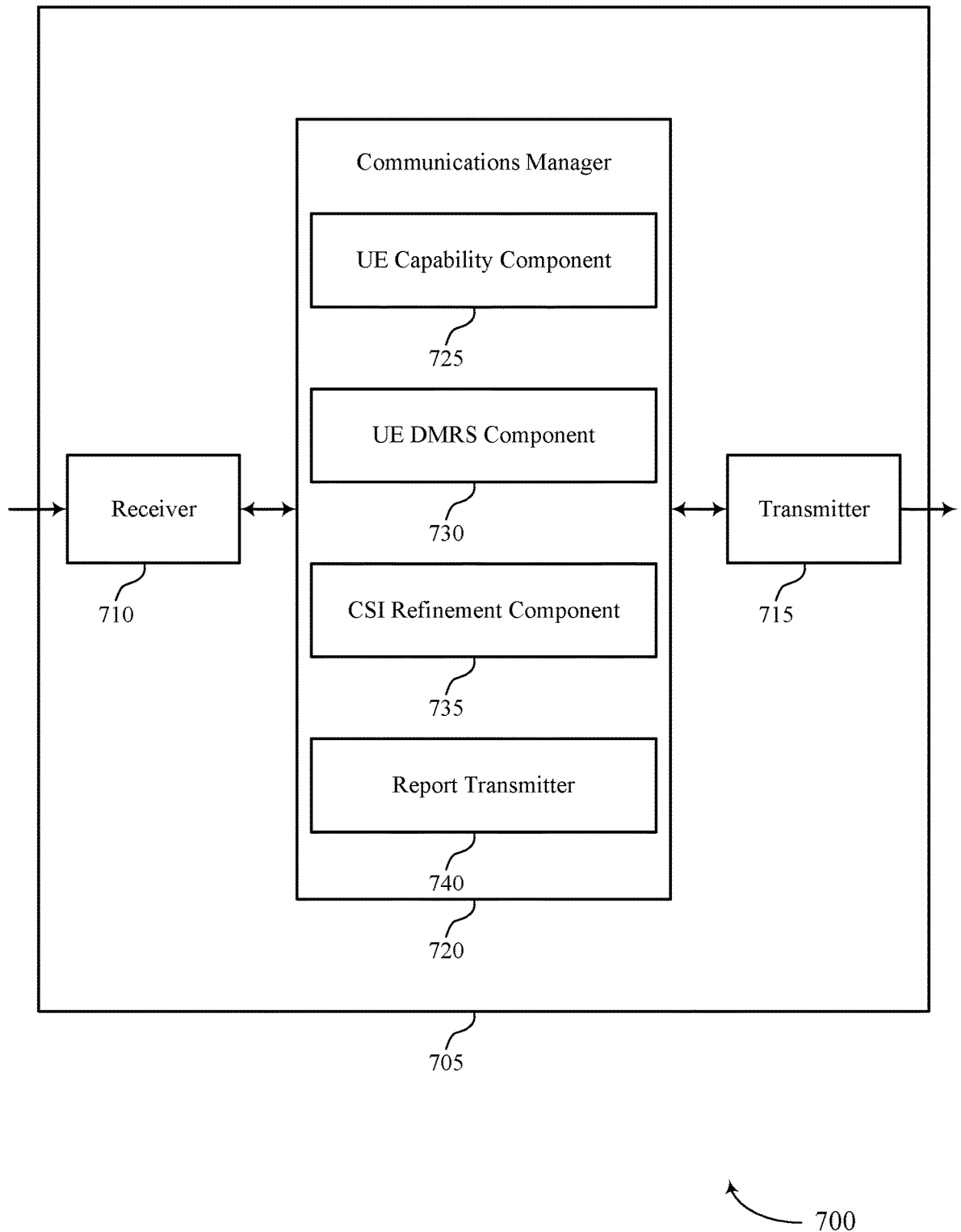

FIG. 7 shows a block diagram 700 of a device 705 that supports CSI reporting using DMRSs in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to CSI reporting using DMRSs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to CSI reporting using DMRSs). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of CSI reporting using DMRSs as described herein. For example, the communications manager 720 may include a UE capability component 725, a UE DMRS component 730, a CSI refinement component 735, a report transmitter 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The UE capability component 725 may be configured as or otherwise support a means for transmitting, to a base station, signaling indicating a capability of the UE to utilize a DMRS for CSI reporting. The UE DMRS component 730 may be configured as or otherwise support a means for receiving, from the base station and in response to the signaling indicating the capability of the UE, the DMRS. The CSI refinement component 735 may be configured as or otherwise support a means for updating a parameter of a CSI report in response to the received DMRS. The report transmitter 740 may be configured as or otherwise support a means for transmitting, to the base station, the CSI report including the updated parameter.

Figure 8:
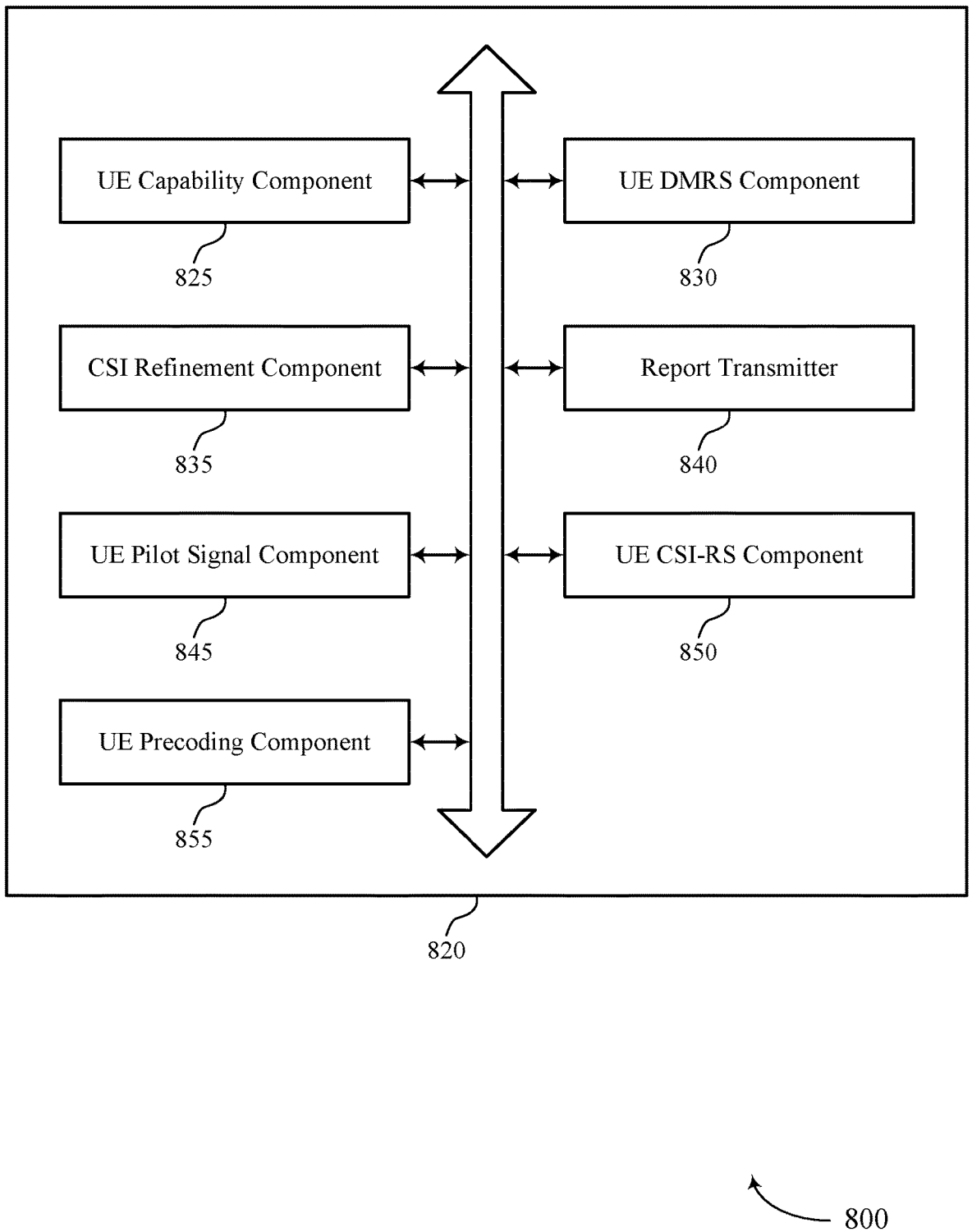
FIG. 8 shows a block diagram of a communications manager that supports CSI reporting using DMRSs in accordance with one or more aspects of the present disclosure.

FIG. 8 shows a block diagram 800 of a communications manager 820 that supports CSI reporting using DMRSs in accordance with one or more aspects of the present disclosure. The communications manager 820 may be an example of aspects of a communications manager 620, a communications manager 720, or both, as described herein. The communications manager 820, or various components thereof, may be an example of means for performing various aspects of CSI reporting using DMRSs as described herein. For example, the communications manager 820 may include a UE capability component 825, a UE DMRS component 830, a CSI refinement component 835, a report transmitter 840, a UE pilot signal component 845, a UE CSI-RS component 850, a UE precoding component 855, or any combination thereof. Each of these components may communicate, directly or indirectly, with one another (e.g., via one or more buses).

The communications manager 820 may support wireless communication at a UE in accordance with examples as disclosed herein. The UE capability component 825 may be configured as or otherwise support a means for transmitting, to a base station, signaling indicating a capability of the UE to utilize a DMRS for CSI reporting. The UE DMRS component 830 may be configured as or otherwise support a means for receiving, from the base station and in response to the signaling indicating the capability of the UE, the DMRS. The CSI refinement component 835 may be configured as or otherwise support a means for updating a parameter of a CSI report in response to the received DMRS. The report transmitter 840 may be configured as or otherwise support a means for transmitting, to the base station, the CSI report including the updated parameter.

In some examples, the UE pilot signal component 845 may be configured as or otherwise support a means for receiving, from the base station and in response to the signaling indicating the capability of the UE, a pilot signal, where updating the parameter of the CSI report is based on the received pilot signal.

In some examples, the pilot signal is precoded using a precoding matrix that is different than a precoding matrix used to precode the DMRS.

In some examples, the UE precoding component 855 may be configured as or otherwise support a means for generating the precoding matrix used to precode the pilot signal. In some examples, the UE precoding component 855 may be configured as or otherwise support a means for transmitting, to the base station, signaling indicating the precoding matrix used to precode the pilot signal, where receiving the pilot signal is based on transmitting the signaling indicating the precoding matrix used to precode the pilot signal.

In some examples, the UE CSI-RS component 850 may be configured as or otherwise support a means for receiving, from the base station, a CSI-RS, where generating the precoding matrix used to precode the pilot signal is based on the received CSI-RS.

In some examples, the UE precoding component 855 may be configured as or otherwise support a means for receiving, from the base station, signaling indicating the precoding matrix used to precode the pilot signal, where receiving the pilot signal is based on receiving the signaling indicating the precoding matrix used to precode the pilot signal.

In some examples, the UE pilot signal component 845 may be configured as or otherwise support a means for receiving, from the base station, signaling indicating a set of resources for receiving the pilot signal, where the set of resources includes one or both of a subset of a set of resources allocated to the UE for downlink data transmissions or a subset of a set of resources allocated to the UE for DMRS transmissions.

In some examples, the UE DMRS component 830 may be configured as or otherwise support a means for receiving, from the base station, signaling indicating a set of resources allocated to one or more second UEs for DMRS transmissions, where the DMRS is received on the set of resources.

In some examples, the report transmitter 840 may be configured as or otherwise support a means for receiving, from the base station, signaling indicating a periodicity associated with the CSI report, where transmitting the CSI report is based on the periodicity. In some examples, the periodicity indicates to transmit the CSI report on a slot-by-slot basis.

In some examples, the UE CSI-RS component 850 may be configured as or otherwise support a means for receiving, from the base station and prior to receiving the DMRS, a CSI-RS. In some examples, the report transmitter 840 may be configured as or otherwise support a means for generating a second CSI report based on the received CSI-RS. In some examples, the parameter of the CSI report includes a PMI, a CQI, an RI, an MCS, an RSRP value, an SINR value, or any combination thereof.

Figure 9:
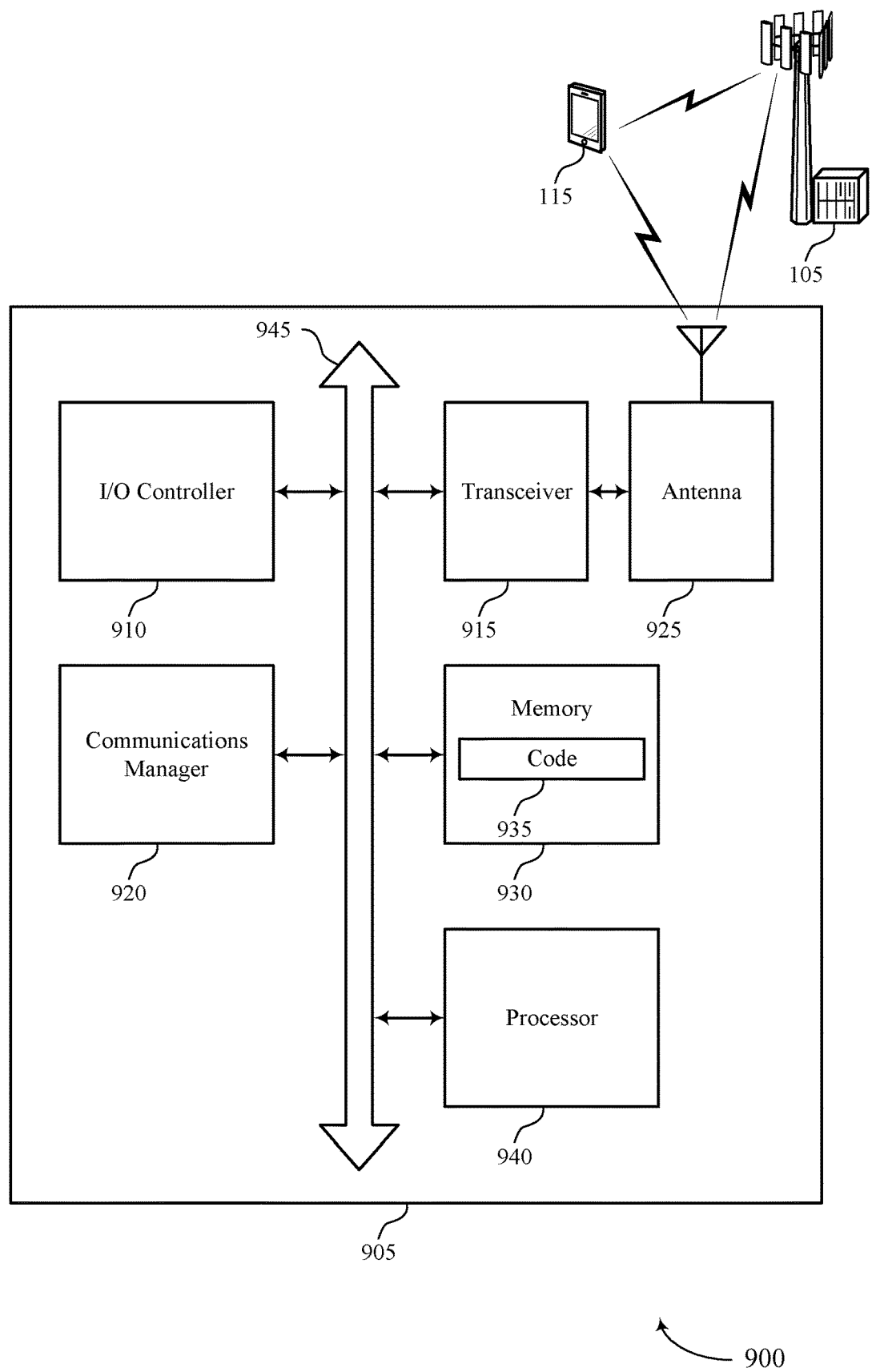
FIG. 9 shows a diagram of a system including a device that supports CSI reporting using DMRSs in accordance with one or more aspects of the present disclosure.

FIG. 9 shows a diagram of a system 900 including a device 905 that supports CSI reporting using DMRSs in accordance with one or more aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting CSI reporting using DMRSs). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting, to a base station, signaling indicating a capability of the UE to utilize a DMRS for CSI reporting. The communications manager 920 may be configured as or otherwise support a means for receiving, from the base station and in response to the signaling indicating the capability of the UE, the DMRS. The communications manager 920 may be configured as or otherwise support a means for updating a parameter of a CSI report in response to the received DMRS. The communications manager 920 may be configured as or otherwise support a means for transmitting, to the base station, the CSI report including the updated parameter.

By including or configuring the communications manager 920 in accordance with examples as described herein, the device 905 may support techniques for improved user experience related to reduced processing, reduced power consumption, and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of CSI reporting using DMRSs as described herein, or the processor 940 and the memory 930 may be otherwise configured to perform or support such operations.

Figure 10:
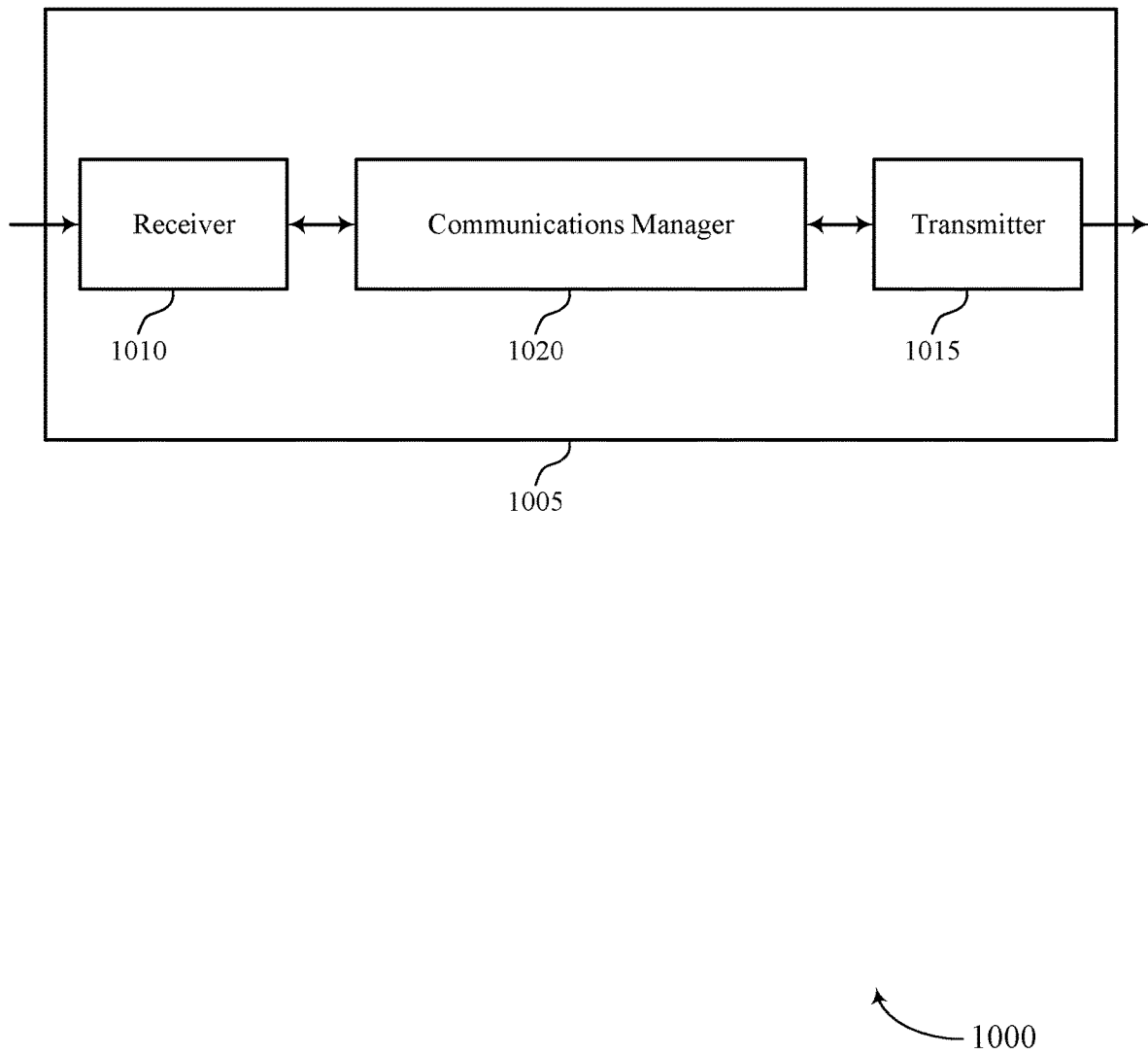
FIGS. 10 and 11 show block diagrams of devices that support CSI reporting using DMRSs in accordance with one or more aspects of the present disclosure.

FIG. 10 shows a block diagram 1000 of a device 1005 that supports CSI reporting using DMRSs in accordance with one or more aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to CSI reporting using DMRSs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to CSI reporting using DMRSs). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of CSI reporting using DMRSs as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for receiving, from a UE, signaling indicating a capability of the UE to utilize a DMRS for CSI reporting. The communications manager 1020 may be configured as or otherwise support a means for transmitting, to the UE and in response to the signaling indicating the capability of the UE, the DMRS. The communications manager 1020 may be configured as or otherwise support a means for receiving, from the UE, a CSI report in response to transmitting the DMRS.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing and more efficient utilization of communication resources.

Figure 11:
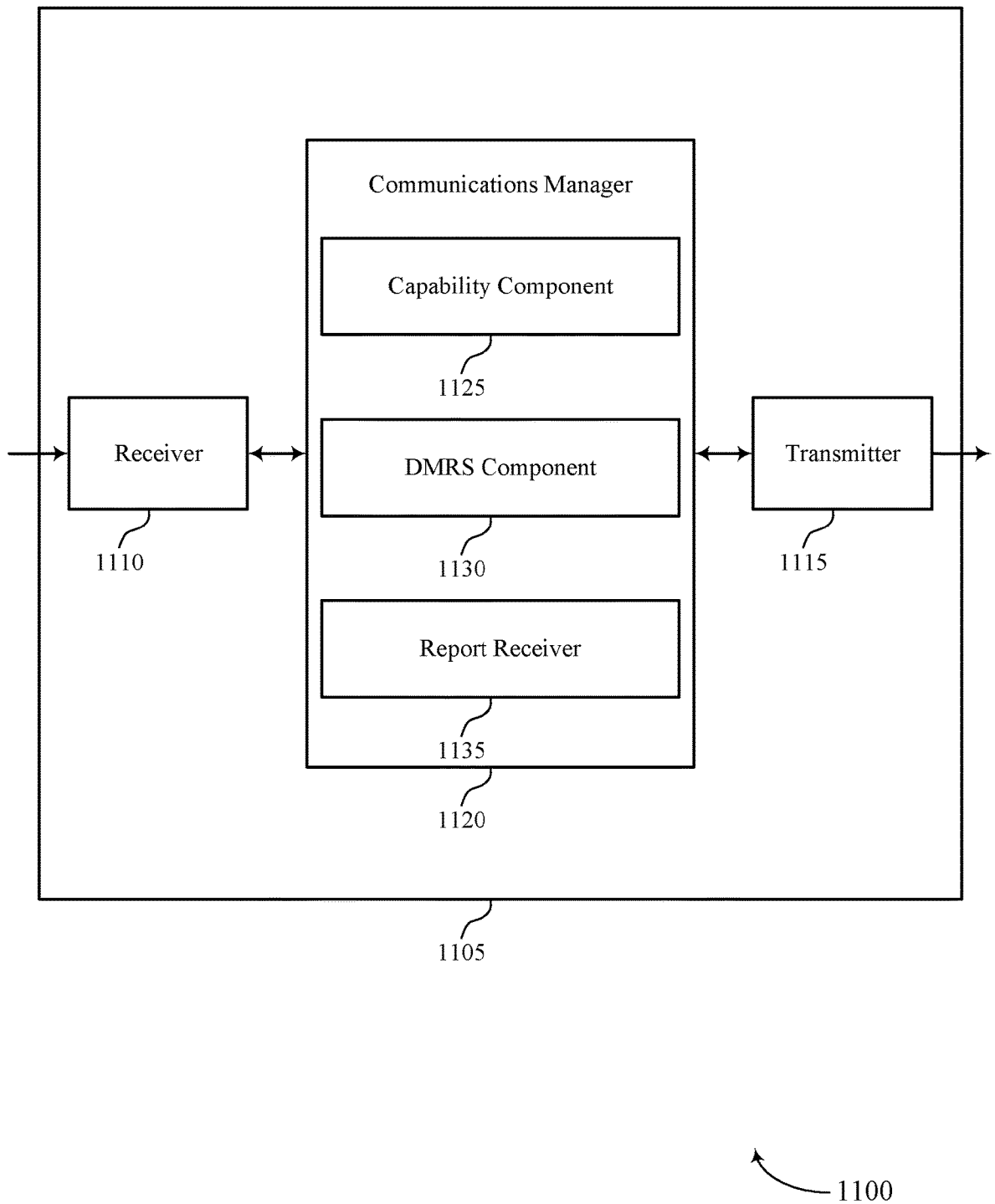

FIG. 11 shows a block diagram 1100 of a device 1105 that supports CSI reporting using DMRSs in accordance with one or more aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to CSI reporting using DMRSs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to CSI reporting using DMRSs). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of CSI reporting using DMRSs as described herein. For example, the communications manager 1120 may include a capability component 1125, a DMRS component 1130, a report receiver 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The capability component 1125 may be configured as or otherwise support a means for receiving, from a UE, signaling indicating a capability of the UE to utilize a DMRS for CSI reporting. The DMRS component 1130 may be configured as or otherwise support a means for transmitting, to the UE and in response to the signaling indicating the capability of the UE, the DMRS. The report receiver 1135 may be configured as or otherwise support a means for receiving, from the UE, a CSI report in response to transmitting the DMRS.

Figure 12:
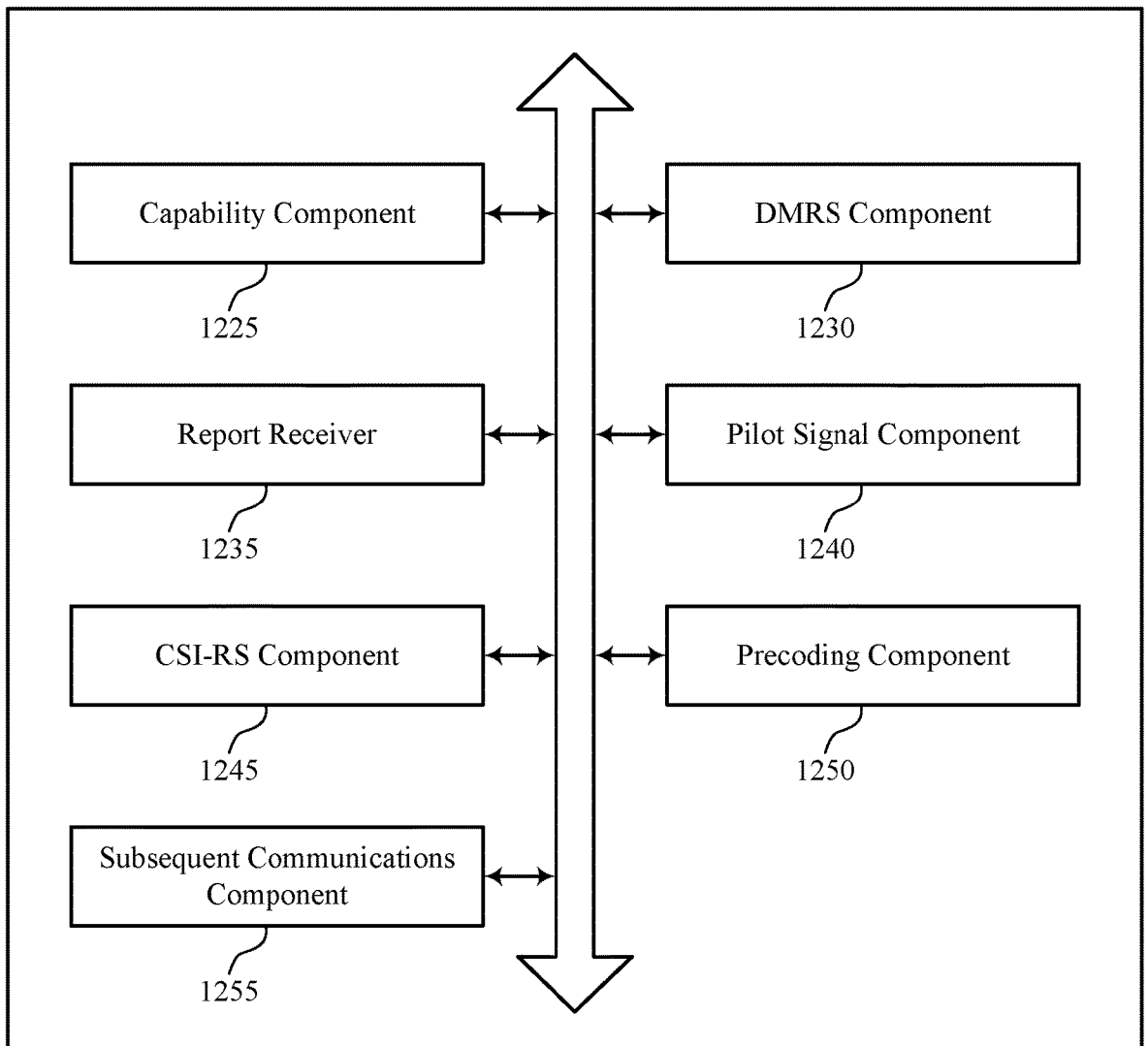
FIG. 12 shows a block diagram of a communications manager that supports CSI reporting using DMRSs in accordance with one or more aspects of the present disclosure.

FIG. 12 shows a block diagram 1200 of a communications manager 1220 that supports CSI reporting using DMRSs in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of CSI reporting using DMRSs as described herein. For example, the communications manager 1220 may include a capability component 1225, a DMRS component 1230, a report receiver 1235, a pilot signal component 1240, a CSI-RS component 1245, a precoding component 1250, a subsequent communications component 1255, or any combination thereof. Each of these components may communicate, directly or indirectly, with one another (e.g., via one or more buses).

The communications manager 1220 may support wireless communications at a base station in accordance with examples as disclosed herein. The capability component 1225 may be configured as or otherwise support a means for receiving, from a UE, signaling indicating a capability of the UE to utilize a DMRS for CSI reporting. The DMRS component 1230 may be configured as or otherwise support a means for transmitting, to the UE and in response to the signaling indicating the capability of the UE, the DMRS. The report receiver 1235 may be configured as or otherwise support a means for receiving, from the UE, a CSI report in response to transmitting the DMRS.

In some examples, the pilot signal component 1240 may be configured as or otherwise support a means for transmitting, to the UE and in response to the signaling indicating the capability of the UE, a pilot signal, where receiving the CSI report is based on transmitting the pilot signal.

In some examples, the precoding component 1250 may be configured as or otherwise support a means for precoding the pilot signal using a precoding matrix that is different than a precoding matrix used to precode the DMRS.

In some examples, the precoding component 1250 may be configured as or otherwise support a means for receiving, from the UE, signaling indicating the precoding matrix used to precode the pilot signal, where precoding the pilot signal is based on the signaling indicating the precoding matrix used to precode the pilot signal.

In some examples, the precoding component 1250 may be configured as or otherwise support a means for transmitting, to the UE, signaling indicating the precoding matrix used to precode the pilot signal, where transmitting the pilot signal is based on transmitting the signaling indicating the precoding matrix used to precode the pilot signal.

In some examples, the pilot signal component 1240 may be configured as or otherwise support a means for determining a quantity of antenna ports for transmitting the pilot signal, where transmitting the pilot signal is based on the determined quantity of antenna ports.

In some examples, the pilot signal component 1240 may be configured as or otherwise support a means for transmitting, to the UE, signaling indicating a set of resources for receiving the pilot signal, where the set of resources includes one or both of a subset of a set of resources allocated to the UE for downlink data transmissions or a subset of a set of resources allocated to the UE for DMRS transmissions.

In some examples, the report receiver 1235 may be configured as or otherwise support a means for transmitting, to the UE, signaling indicating a periodicity associated with the CSI report, where receiving the CSI report is based on the periodicity. In some examples, the periodicity indicates for the UE to transmit the CSI report on a slot-by-slot basis.

In some examples, the CSI-RS component 1245 may be configured as or otherwise support a means for transmitting, to the UE and prior to transmitting the DMRS, a CSI-RS. In some examples, the report receiver 1235 may be configured as or otherwise support a means for receiving, from the UE and prior to receiving the channel state information report, a second channel state information report based on transmitting the CSI-RS.

In some examples, the subsequent communications component 1255 may be configured as or otherwise support a means for combining one or more parameters of the second CSI report and one or more parameters of the CSI report. In some examples, the subsequent communications component 1255 may be configured as or otherwise support a means for communicating with the UE based on the combination. In some examples, the CSI report includes a parameter. In some examples, the parameter includes a PMI, a CQI, an RI, an MCS, an RSRP value, an SINR value, or any combination thereof.

Figure 13:
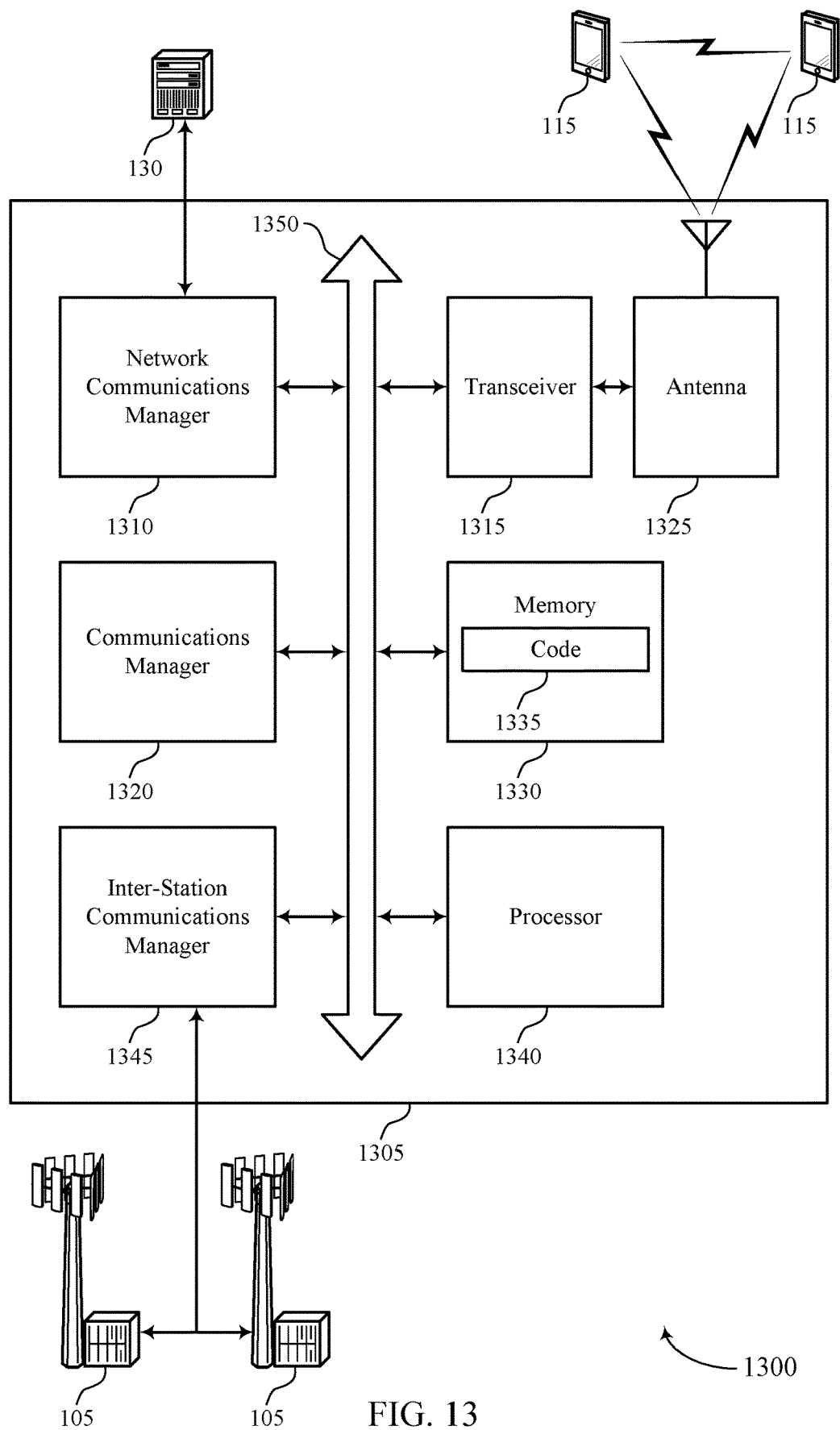
FIG. 13 shows a diagram of a system including a device that supports CSI reporting using DMRSs in accordance with one or more aspects of the present disclosure.

FIG. 13 shows a diagram of a system 1300 including a device 1305 that supports CSI reporting using DMRSs in accordance with one or more aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting CSI reporting using DMRSs). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for receiving, from a UE, signaling indicating a capability of the UE to utilize a DMRS for CSI reporting. The communications manager 1320 may be configured as or otherwise support a means for transmitting, to the UE and in response to the signaling indicating the capability of the UE, the DMRS. The communications manager 1320 may be configured as or otherwise support a means for receiving, from the UE, a CSI report in response to transmitting the DMRS.

By including or configuring the communications manager 1320 in accordance with examples as described herein, the device 1305 may support techniques for improved user experience related to reduced processing and more efficient utilization of communication resources, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of CSI reporting using DMRSs as described herein, or the processor 1340 and the memory 1330 may be otherwise configured to perform or support such operations.

Figure 14:
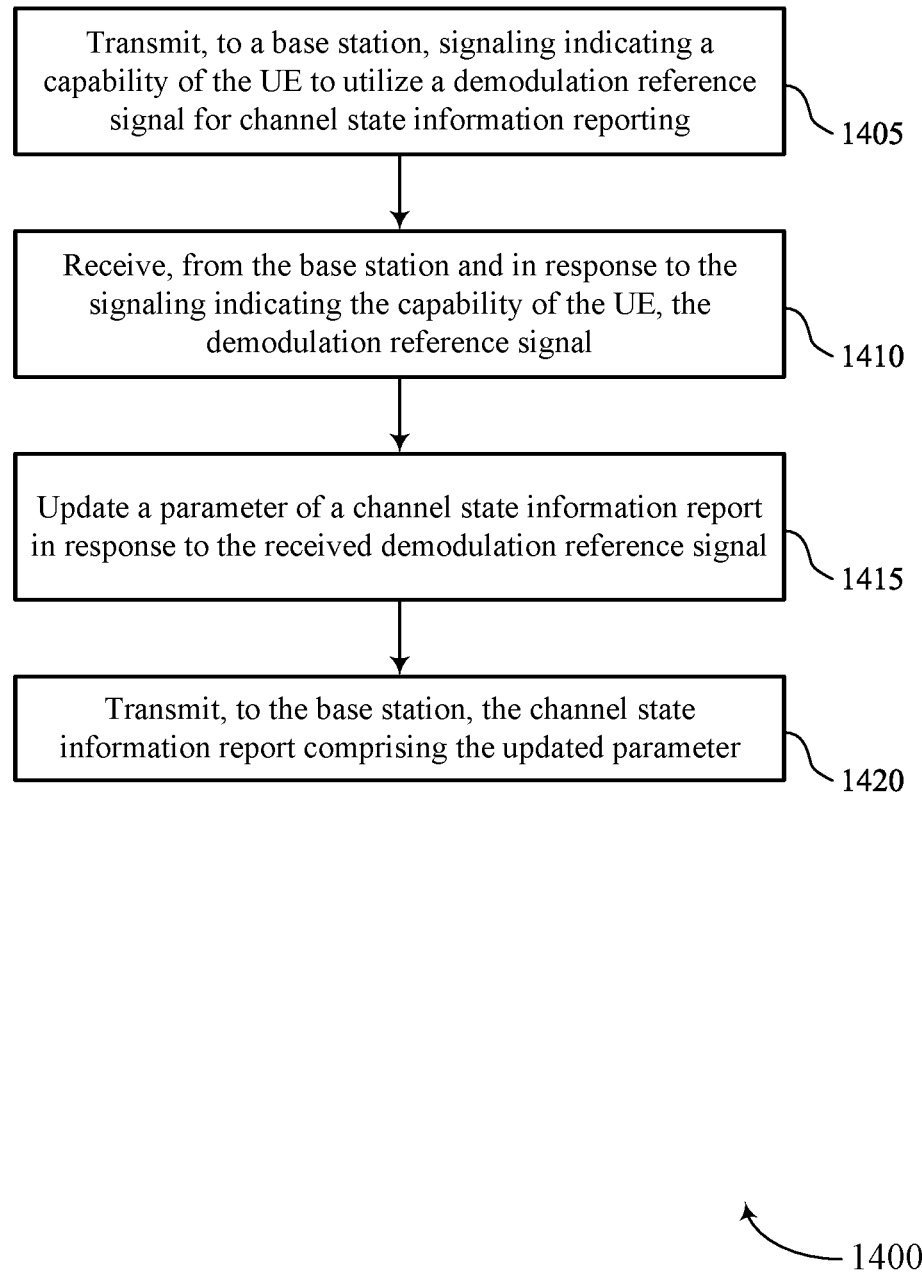
FIGS. 14 through 17 show flowcharts illustrating methods that support CSI reporting using DMRSs in accordance with one or more aspects of the present disclosure.

FIG. 14 shows a flowchart illustrating a method 1400 that supports CSI reporting using DMRSs in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, signaling indicating a capability of the UE to utilize a DMRS for CSI reporting. The operations of 1405 may be performed in accordance with examples as disclosed herein. In some examples, aspects of the operations of 1405 may be performed by a UE capability component 825 as described with reference to FIG. 8.

At 1410, the method may include receiving, from the base station and in response to the signaling indicating the capability of the UE, the DMRS. The operations of 1410 may be performed in accordance with examples as disclosed herein. In some examples, aspects of the operations of 1410 may be performed by a UE DMRS component 830 as described with reference to FIG. 8.

At 1415, the method may include updating a parameter of a CSI report in response to the received DMRS. The operations of 1415 may be performed in accordance with examples as disclosed herein. In some examples, aspects of the operations of 1415 may be performed by a CSI refinement component 835 as described with reference to FIG. 8.

At 1420, the method may include transmitting, to the base station, the CSI report including the updated parameter. The operations of 1420 may be performed in accordance with examples as disclosed herein. In some examples, aspects of the operations of 1420 may be performed by a report transmitter 840 as described with reference to FIG. 8.

Figure 15:
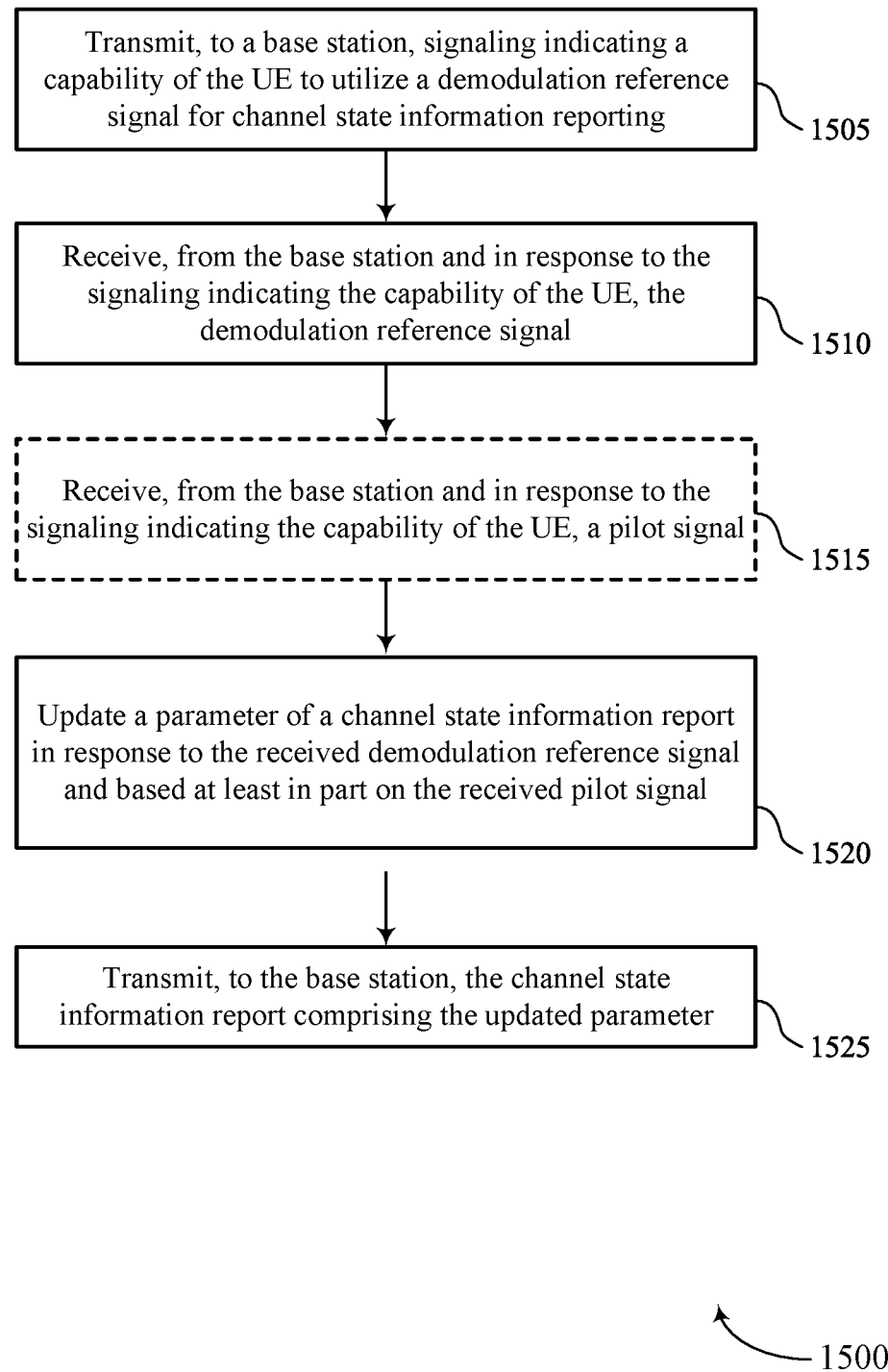

FIG. 15 shows a flowchart illustrating a method 1500 that supports CSI reporting using DMRSs in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, signaling indicating a capability of the UE to utilize a DMRS for CSI reporting. The operations of 1505 may be performed in accordance with examples as disclosed herein. In some examples, aspects of the operations of 1505 may be performed by a UE capability component 825 as described with reference to FIG. 8.

At 1510, the method may include receiving, from the base station and in response to the signaling indicating the capability of the UE, the DMRS. The operations of 1510 may be performed in accordance with examples as disclosed herein. In some examples, aspects of the operations of 1510 may be performed by a UE DMRS component 830 as described with reference to FIG. 8.

At 1515, the method may include receiving, from the base station and in response to the signaling indicating the capability of the UE, a pilot signal. The operations of 1515 may be performed in accordance with examples as disclosed herein. In some examples, aspects of the operations of 1515 may be performed by a UE pilot signal component 845 as described with reference to FIG. 8.

At 1520, the method may include updating a parameter of a CSI report in response to the received DMRS and based on the received pilot signal. The operations of 1520 may be performed in accordance with examples as disclosed herein. In some examples, aspects of the operations of 1520 may be performed by a CSI refinement component 835 as described with reference to FIG. 8.

At 1525, the method may include transmitting, to the base station, the CSI report including the updated parameter. The operations of 1525 may be performed in accordance with examples as disclosed herein. In some examples, aspects of the operations of 1525 may be performed by a report transmitter 840 as described with reference to FIG. 8.

Figure 16:
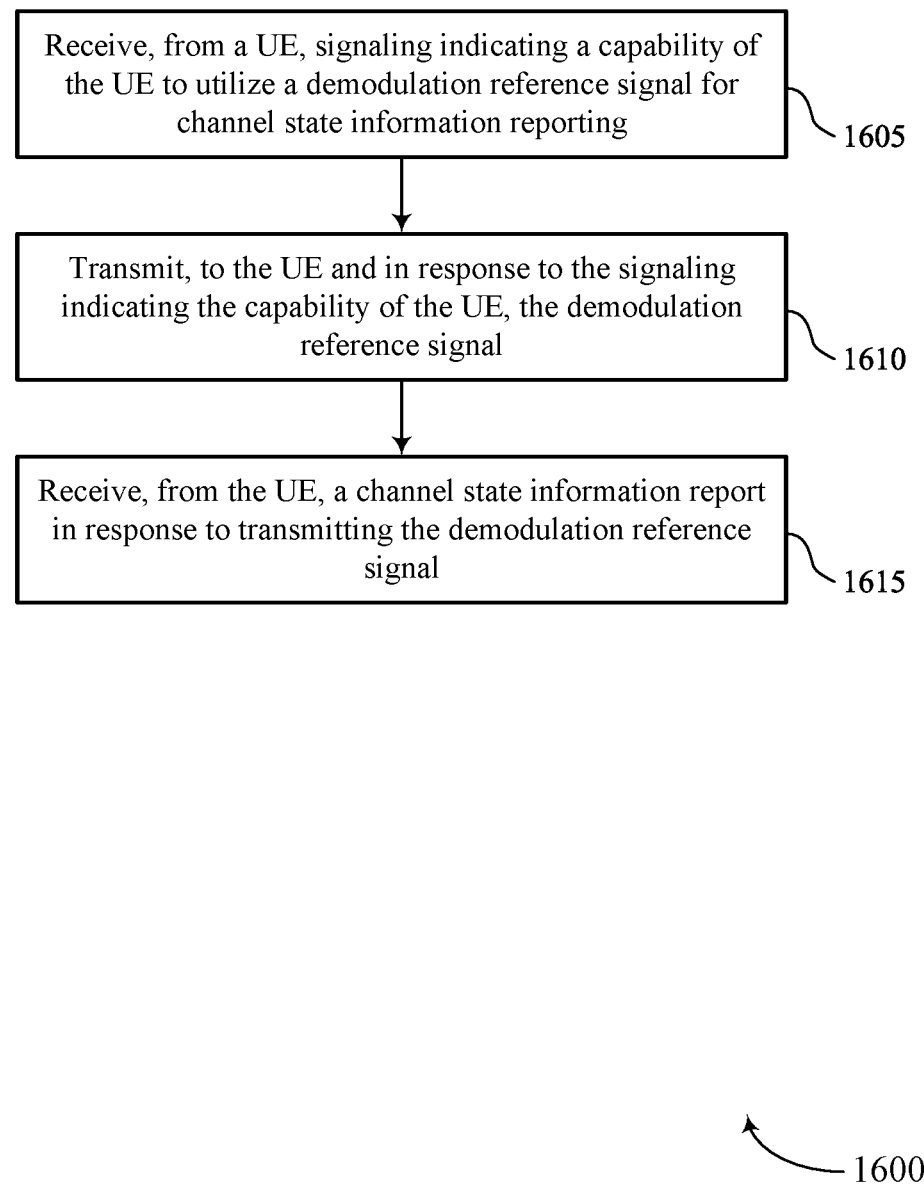

FIG. 16 shows a flowchart illustrating a method 1600 that supports CSI reporting using DMRSs in accordance with one or more aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, signaling indicating a capability of the UE to utilize a DMRS for CSI reporting. The operations of 1605 may be performed in accordance with examples as disclosed herein. In some examples, aspects of the operations of 1605 may be performed by a capability component 1225 as described with reference to FIG. 12.

At 1610, the method may include transmitting, to the UE and in response to the signaling indicating the capability of the UE, the DMRS. The operations of 1610 may be performed in accordance with examples as disclosed herein. In some examples, aspects of the operations of 1610 may be performed by a DMRS component 1230 as described with reference to FIG. 12.

At 1615, the method may include receiving, from the UE, a CSI report in response to transmitting the DMRS. The operations of 1615 may be performed in accordance with examples as disclosed herein. In some examples, aspects of the operations of 1615 may be performed by a report receiver 1235 as described with reference to FIG. 12.

Figure 17:
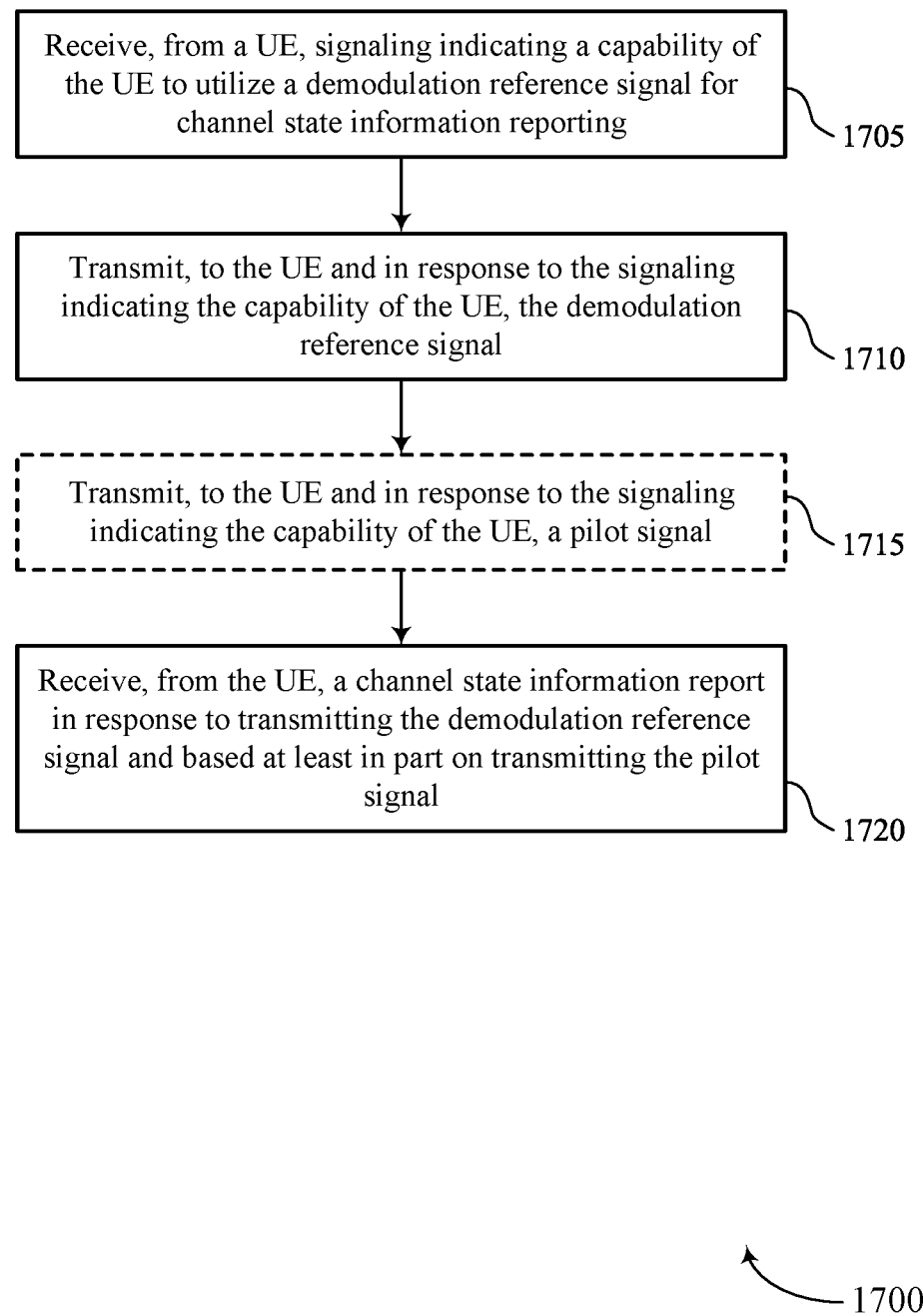

FIG. 17 shows a flowchart illustrating a method 1700 that supports CSI reporting using DMRSs in accordance with one or more aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, signaling indicating a capability of the UE to utilize a DMRS for CSI reporting. The operations of 1705 may be performed in accordance with examples as disclosed herein. In some examples, aspects of the operations of 1705 may be performed by a capability component 1225 as described with reference to FIG. 12.

At 1710, the method may include transmitting, to the UE and in response to the signaling indicating the capability of the UE, the DMRS. The operations of 1710 may be performed in accordance with examples as disclosed herein. In some examples, aspects of the operations of 1710 may be performed by a DMRS component 1230 as described with reference to FIG. 12.

At 1715, the method may include transmitting, to the UE and in response to the signaling indicating the capability of the UE, a pilot signal. The operations of 1715 may be performed in accordance with examples as disclosed herein. In some examples, aspects of the operations of 1715 may be performed by a pilot signal component 1240 as described with reference to FIG. 12.

At 1720, the method may include receiving, from the UE, a CSI report in response to transmitting the DMRS and based on transmitting the pilot signal. The operations of 1720 may be performed in accordance with examples as disclosed herein. In some examples, aspects of the operations of 1720 may be performed by a report receiver 1235 as described with reference to FIG. 12.

The following provides an overview of aspects of the present disclosure:

Aspect 1: A method for wireless communication at a UE, comprising: transmitting, to a base station, signaling indicating a capability of the UE to utilize a DMRS for CSI reporting; receiving, from the base station and in response to the signaling indicating the capability of the UE, the DMRS; updating a parameter of a CSI report in response to the received DMRS; and transmitting, to the base station, the CSI report comprising the updated parameter.

Aspect 2: The method of aspect 1, further comprising: receiving, from the base station and in response to the signaling indicating the capability of the UE, a pilot signal, wherein updating the parameter of the CSI report is based at least in part on the received pilot signal.

Aspect 3: The method of aspect 2, wherein the pilot signal is precoded using a precoding matrix that is different than a precoding matrix used to precode the DMRS.

Aspect 4: The method of aspect 3, further comprising: generating the precoding matrix used to precode the pilot signal; and transmitting, to the base station, signaling indicating the precoding matrix used to precode the pilot signal, wherein receiving the pilot signal is based at least in part on transmitting the signaling indicating the precoding matrix used to precode the pilot signal.

Aspect 5: The method of aspect 4, further comprising: receiving, from the base station, a CSI-RS, wherein generating the precoding matrix used to precode the pilot signal is based at least in part on the received CSI-RS.

Aspect 6: The method of any of aspects 3 through 5, further comprising: receiving, from the base station, signaling indicating the precoding matrix used to precode the pilot signal, wherein receiving the pilot signal is based at least in part on receiving the signaling indicating the precoding matrix used to precode the pilot signal.

Aspect 7: The method of any of aspects 2 through 6, further comprising: receiving, from the base station, signaling indicating a set of resources for receiving the pilot signal, wherein the set of resources comprises one or both of a subset of a set of resources allocated to the UE for downlink data transmissions or a subset of a set of resources allocated to the UE for DMRS transmissions.

Aspect 8: The method of any of aspects 2 through 7, further comprising: receiving, from the base station, signaling indicating a set of resources allocated to one or more second UEs for DMRS transmissions, wherein the DMRS is received on the set of resources.

Aspect 9: The method of any of aspects 1 through 8, further comprising: receiving, from the base station, signaling indicating a periodicity associated with the CSI report, wherein transmitting the CSI report is based at least in part on the periodicity.

Aspect 10: The method of aspect 9, wherein the periodicity indicates to transmit the CSI report on a slot-by-slot basis.

Aspect 11: The method of any of aspects 1 through 10, further comprising: receiving, from the base station and prior to receiving the DMRS, a CSI-RS; and generating a second CSI report based at least in part on the received CSI-RS.

Aspect 12: The method of any of aspects 1 through 11, wherein the parameter of the CSI report comprises a PMI, a CQI, an RI, an MCS, an RSRP value, an SINR value, or any combination thereof.

Aspect 13: A method for wireless communications at a base station, comprising: receiving, from a UE, signaling indicating a capability of the UE to utilize a DMRS for CSI reporting; transmitting, to the UE and in response to the signaling indicating the capability of the UE, the DMRS; and receiving, from the UE, a CSI report in response to transmitting the DMRS.

Aspect 14: The method of aspect 13, further comprising: transmitting, to the UE and in response to the signaling indicating the capability of the UE, a pilot signal, wherein receiving the CSI report is based at least in part on transmitting the pilot signal.

Aspect 15: The method of aspect 14, further comprising: precoding the pilot signal using a precoding matrix that is different than a precoding matrix used to precode the DMRS.

Aspect 16: The method of aspect 15, further comprising: receiving, from the UE, signaling indicating the precoding matrix used to precode the pilot signal, wherein precoding the pilot signal is based at least in part on the signaling indicating the precoding matrix used to precode the pilot signal.

Aspect 17: The method of any of aspects 15 through 16, further comprising: transmitting, to the UE, signaling indicating the precoding matrix used to precode the pilot signal, wherein transmitting the pilot signal is based at least in part on transmitting the signaling indicating the precoding matrix used to precode the pilot signal.

Aspect 18: The method of any of aspects 14 through 17, further comprising: determining a quantity of antenna ports for transmitting the pilot signal, wherein transmitting the pilot signal is based at least in part on the determined quantity of antenna ports.

Aspect 19: The method of any of aspects 14 through 18, further comprising: transmitting, to the UE, signaling indicating a set of resources for receiving the pilot signal, wherein the set of resources comprises one or both of a subset of a set of resources allocated to the UE for downlink data transmissions or a subset of a set of resources allocated to the UE for DMRS transmissions.

Aspect 20: The method of any of aspects 13 through 19, further comprising: transmitting, to the UE, signaling indicating a periodicity associated with the CSI report, wherein receiving the CSI report is based at least in part on the periodicity.

Aspect 21: The method of aspect 20, wherein the periodicity indicates for the UE to transmit the CSI report on a slot-by-slot basis.

Aspect 22: The method of any of aspects 13 through 21, further comprising: transmitting, to the UE and prior to transmitting the DMRS, a CSI-RS; and receiving, from the UE and prior to receiving the CSI report, a second CSI report based at least in part on transmitting the CSI-RS Aspect 23: The method of aspect 22, further comprising: combining one or more parameters of the second CSI report and one or more parameters of the CSI report; and communicating with the UE based at least in part on the combination.

Aspect 24: The method of any of aspects 13 through 23, wherein the CSI report comprises a parameter, the parameter comprises a PMI, a CQI, an RI, an MCS, an RSRP value, an SINR value, or any combination thereof.

Aspect 25: An apparatus for wireless communication at a UE, comprising a processor and memory coupled to the processor, the processor and memory configured to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communications at a base station, comprising a processor and memory coupled to the processor, the processor and memory configured to perform a method of any of aspects 13 through 24.

Aspect 29: An apparatus for wireless communications at a base station, comprising at least one means for performing a method of any of aspects 13 through 24.

Aspect 30: A non-transitory computer-readable medium storing code for wireless communications at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor; and
   memory coupled to the processor, the processor and the memory configured to:
   transmit, to a network device, a capability message comprising capability information of the UE, the capability information indicating that the UE supports updating a parameter of a channel state information report using measurements of a demodulation reference signal and an extended demodulation reference signal;
   receive, from the network device and based at least in part on the capability information of the UE, the demodulation reference signal for measurement by the UE;
   receive, from the network device and based at least in part on the capability information of the UE, the extended demodulation reference signal for measurement by the UE, wherein the extended demodulation reference signal is associated with a first precoding matrix that is different than a second precoding matrix associated with the demodulation reference signal;
   update the parameter of the channel state information report in response to both the received demodulation reference signal and the received extended demodulation reference signal based at least in part on the measurements of both the demodulation reference signal and the extended demodulation reference signal; and
   transmit, to the network device, the channel state information report comprising the updated parameter.

2. The apparatus of claim 1, wherein the extended demodulation reference signal is precoded using the first precoding matrix that is different than the second precoding matrix used to precode the demodulation reference signal.

3. The apparatus of claim 2, wherein the processor and the memory are further configured to:
   generate the first precoding matrix used to precode the extended demodulation reference signal; and
   transmit, to the network device, signaling indicating the first precoding matrix used to precode the extended demodulation reference signal, wherein receiving the extended demodulation reference signal is based at least in part on transmitting the signaling indicating the first precoding matrix used to precode the extended demodulation reference signal.

4. The apparatus of claim 3, wherein the processor and the memory are further configured to:
   receive, from the network device, a channel state information reference signal, wherein generating the first precoding matrix used to precode the extended demodulation reference signal is based at least in part on the received channel state information reference signal.

5. The apparatus of claim 2, wherein the processor and the memory are further configured to:
   receive, from the network device, signaling indicating the first precoding matrix used to precode the extended demodulation reference signal, wherein receiving the extended demodulation reference signal is based at least in part on receiving the signaling indicating the first precoding matrix used to precode the extended demodulation reference signal.

6. The apparatus of claim 1, wherein the processor and the memory are further configured to:
   receive, from the network device, signaling indicating a set of resources for receiving the extended demodulation reference signal, wherein the set of resources comprises one or both of a subset of a set of resources allocated to the UE for downlink data transmissions or a subset of a set of resources allocated to the UE for demodulation reference signal transmissions.

7. The apparatus of claim 1, wherein the processor and the memory are further configured to:
receive, from the network device, signaling indicating a set of resources for receiving the demodulation reference signal, wherein the demodulation reference signal is received using the set of resources.

8. The apparatus of claim 1, wherein the processor and the memory are further configured to:
receive, from the network device, signaling indicating a periodicity associated with the channel state information report, wherein transmitting the channel state information report is based at least in part on the periodicity.

9. The apparatus of claim 8, wherein the periodicity indicates to transmit the channel state information report on a slot-by-slot basis.

10. The apparatus of claim 1, wherein the processor and the memory are further configured to:
receive, from the network device and prior to receiving the demodulation reference signal, a channel state information reference signal; and
generate a second channel state information report based at least in part on the received channel state information reference signal.

11. The apparatus of claim 1, wherein the parameter of the channel state information report comprises a precoding matrix indicator, a channel quality indicator, a rank indicator, a modulation and coding scheme, a reference signal received power value, a signal-to-interference plus noise value, or any combination thereof.

12. An apparatus for wireless communications at a network device, comprising:
a processor; and
memory coupled to the processor, the processor and the memory configured to:
receive, from a user equipment (UE), a capability message comprising capability information of the UE, the capability information indicating that the UE supports updating a parameter of a channel state information report using measurements of a demodulation reference signal and an extended demodulation reference signal;
transmit, to the UE and based at least in part on the capability information of the UE, the demodulation reference signal for measurement by the UE;
transmit, to the UE and based at least in part on the capability information of the UE, the extended demodulation reference signal for measurement by the UE, wherein the extended demodulation reference signal is associated with a first precoding matrix that is different than a second precoding matrix associated with the demodulation reference signal; and
receive, from the UE, the channel state information report in response to both the demodulation reference signal and the extended demodulation reference signal.

13. The apparatus of claim 12, wherein the processor and the memory are further configured to:
precode the extended demodulation reference signal using the first precoding matrix that is different than the second precoding matrix used to precode the demodulation reference signal.

14. The apparatus of claim 12, wherein the processor and the memory are further configured to:
transmit, to the UE, signaling indicating a set of resources for receiving the extended demodulation reference signal, wherein the set of resources comprises one or both of a subset of a set of resources allocated to the UE for downlink data transmissions or a subset of a set of resources allocated to the UE for demodulation reference signal transmissions.

15. The apparatus of claim 12, wherein the processor and the memory are further configured to:
transmit, to the UE and prior to transmitting the demodulation reference signal, a channel state information reference signal; and
receive, from the UE and prior to receiving the channel state information report, a second channel state information report based at least in part on transmitting the channel state information reference signal.

16. The apparatus of claim 15, wherein the processor and the memory are further configured to:
combine one or more parameters of the second channel state information report and one or more parameters of the channel state information report; and
communicate with the UE based at least in part on the combination.

17. A method for wireless communication at a user equipment (UE), comprising:
transmitting, to a network device, a capability message comprising capability information of the UE, the capability information indicating that the UE supports updating a parameter of a channel state information report using measurements of a demodulation reference signal and an extended demodulation reference signal;
receiving, from the network device and based at least in part on in the capability information of the UE, the demodulation reference signal for measurement by the UE;
receiving, from the network device and based at least in part on the capability information of the UE, the extended demodulation reference signal for measurement by the UE, wherein the extended demodulation reference signal is associated with a first precoding matrix that is different than a second precoding matrix associated with the demodulation reference signal;
updating the parameter of the channel state information report in response to both the received demodulation reference signal and the received extended demodulation reference signal based at least in part on the measurements of both the demodulation reference signal and the extended demodulation reference signal; and
transmitting, to the network device, the channel state information report comprising the updated parameter.

* * * * *